(12) United States Patent
Weigand

(10) Patent No.: US 9,414,103 B2
(45) Date of Patent: *Aug. 9, 2016

(54) PERSONALIZED CONTENT

(71) Applicant: AOL Inc., Dulles, VA (US)

(72) Inventor: Gilbert G. Weigand, Ashburn, VA (US)

(73) Assignee: AOL Inc., Dulles, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/523,158

(22) Filed: Oct. 24, 2014

(65) Prior Publication Data

US 2015/0150037 A1 May 28, 2015

Related U.S. Application Data

(63) Continuation of application No. 11/563,663, filed on Nov. 27, 2006, now Pat. No. 8,893,196, which is a continuation of application No. 10/329,766, filed on Dec. 27, 2002, now abandoned.

(51) Int. Cl.
| | |
|---|---|
| *H04N 21/222* | (2011.01) |
| *H04N 21/231* | (2011.01) |
| *H04N 21/2668* | (2011.01) |
| *H04N 7/173* | (2011.01) |
| *H04N 21/2543* | (2011.01) |
| *H04N 21/258* | (2011.01) |
| *H04N 21/433* | (2011.01) |
| *H04N 21/442* | (2011.01) |
| *H04N 21/466* | (2011.01) |
| *H04N 21/4782* | (2011.01) |

(Continued)

(52) U.S. Cl.
CPC .......... *H04N 21/2668* (2013.01); *H04L 65/607* (2013.01); *H04L 67/1095* (2013.01); *H04L 67/16* (2013.01); *H04N 7/17318* (2013.01); *H04N 21/2221* (2013.01); *H04N 21/23106* (2013.01); *H04N 21/23116* (2013.01); *H04N 21/2543* (2013.01); *H04N 21/25891* (2013.01); *H04N 21/4331* (2013.01); *H04N 21/44222* (2013.01); *H04N 21/458* (2013.01); *H04N 21/4668* (2013.01); *H04N 21/4782* (2013.01); *H04N 21/4788* (2013.01); *H04N 21/4826* (2013.01); *H04N 21/632* (2013.01); *H04N 21/64322* (2013.01); *H04N 21/6582* (2013.01); *H04N 21/6587* (2013.01)

(58) Field of Classification Search
None
See application file for complete search history.

(56) References Cited

U.S. PATENT DOCUMENTS

| | | |
|---|---|---|
| 4,872,160 A | 10/1989 | Hemmady et al. |
| 5,014,125 A | 5/1991 | Pocock et al. |

(Continued)

OTHER PUBLICATIONS

International Search Report for International Application No. PCT/US03/12873, mailed Jul. 14, 2003.

(Continued)

*Primary Examiner* — Omar S Parra
(74) *Attorney, Agent, or Firm* — Finnegan, Henderson, Farabow, Garrett & Dunner LLP

(57) ABSTRACT

A media switch enables a terminal to access content by receiving a content request from a terminal for a first piece of content to be distributed over a cable system, identifying a personal channel within resources available in the cable system to distribute the first piece of content to the terminal, transmitting access information to the terminal to enable the terminal to access the first piece of content through the personal channel, and interfacing with a cable headend to provide the first piece of content on the personal channel.

17 Claims, 15 Drawing Sheets

(51) Int. Cl.

| | | |
|---|---|---|
| *H04N 21/4788* | (2011.01) | |
| *H04N 21/482* | (2011.01) | |
| *H04N 21/63* | (2011.01) | |
| *H04N 21/643* | (2011.01) | |
| *H04N 21/658* | (2011.01) | |
| *H04N 21/6587* | (2011.01) | |
| *H04L 29/06* | (2006.01) | |
| *H04L 29/08* | (2006.01) | |
| *H04N 21/458* | (2011.01) | |

(56) References Cited

U.S. PATENT DOCUMENTS

| | | | |
|---|---|---|---|
| 5,283,639 A | | 2/1994 | Esch et al. |
| 5,604,542 A | | 2/1997 | Dedrick |
| 5,608,446 A | * | 3/1997 | Carr et al. ............... 725/114 |
| 5,689,641 A | | 11/1997 | Ludwig et al. |
| 5,778,187 A | | 7/1998 | Monteiro et al. |
| 5,799,002 A | | 8/1998 | Krishnan |
| 5,819,036 A | | 10/1998 | Adams et al. |
| 5,867,502 A | | 2/1999 | Chang |
| 5,872,588 A | | 2/1999 | Aras et al. |
| 5,935,245 A | | 8/1999 | Sherer |
| 5,946,614 A | | 8/1999 | Robbins et al. |
| 5,973,722 A | | 10/1999 | Wakai et al. |
| 5,983,005 A | | 11/1999 | Monteiro et al. |
| 6,011,782 A | | 1/2000 | DeSimone et al. |
| 6,097,720 A | | 8/2000 | Araujo et al. |
| 6,119,163 A | | 9/2000 | Monteiro et al. |
| 6,141,336 A | | 10/2000 | Bauchot et al. |
| 6,144,402 A | * | 11/2000 | Norsworthy et al. ......... 725/109 |
| 6,151,632 A | | 11/2000 | Chaddha et al. |
| 6,157,635 A | | 12/2000 | Wang et al. |
| 6,189,039 B1 | | 2/2001 | Harvey et al. |
| 6,195,680 B1 | | 2/2001 | Goldszmidt et al. |
| 6,253,238 B1 | | 6/2001 | Lauder et al. |
| 6,259,701 B1 | | 7/2001 | Shur et al. |
| 6,363,075 B1 | | 3/2002 | Huang et al. |
| 6,363,429 B1 | | 3/2002 | Ketcham |
| 6,411,773 B1 | | 6/2002 | De Vos et al. |
| 6,415,312 B1 | | 7/2002 | Boivie |
| 6,434,622 B1 | | 8/2002 | Monteiro et al. |
| 6,490,285 B2 | | 12/2002 | Lee et al. |
| 6,564,380 B1 | | 5/2003 | Murphy |
| 7,089,577 B1 | | 8/2006 | Rakib et al. |
| 7,092,999 B2 | | 8/2006 | Levitan |
| 7,142,509 B1 | | 11/2006 | Rovner et al. |
| 7,650,621 B2 | * | 1/2010 | Thomas et al. ............... 725/87 |
| 2002/0019984 A1 | | 2/2002 | Rakib |
| 2002/0126685 A1 | | 9/2002 | Leatherbury et al. |
| 2002/0172508 A1 | | 11/2002 | Zennou |
| 2002/0191950 A1 | | 12/2002 | Wang |
| 2003/0115589 A1 | * | 6/2003 | D'Souza et al. ............... 725/10 |
| 2009/0150937 A1 | | 6/2009 | Ellis et al. |
| 2012/0240147 A1 | * | 9/2012 | Rodriguez ......... H04N 7/17318 725/25 |

OTHER PUBLICATIONS

Choi et al., "Design of a Flexible Open Platform for High Performance Active Networks", 1999, St. Louis, Missouri.
Keller et al., "An Active Router Architecture for Multicast Video Distribution", St. Louis, Missouri.
Lockwood et al., "Reprogrammable Network Packet Processing on the Field Programmable Port Extender (FPX)", 2001, St. Louis, Missouri.
Taylor et al., "Dynamic Hardware Plugins (DHP): Exploiting Reconfigurable Hardware for High-Performance Programmable Routers", 2002, St. Louis, Missouri.
PCT International Search Report, Apr. 8, 2003, 6 pages.

* cited by examiner

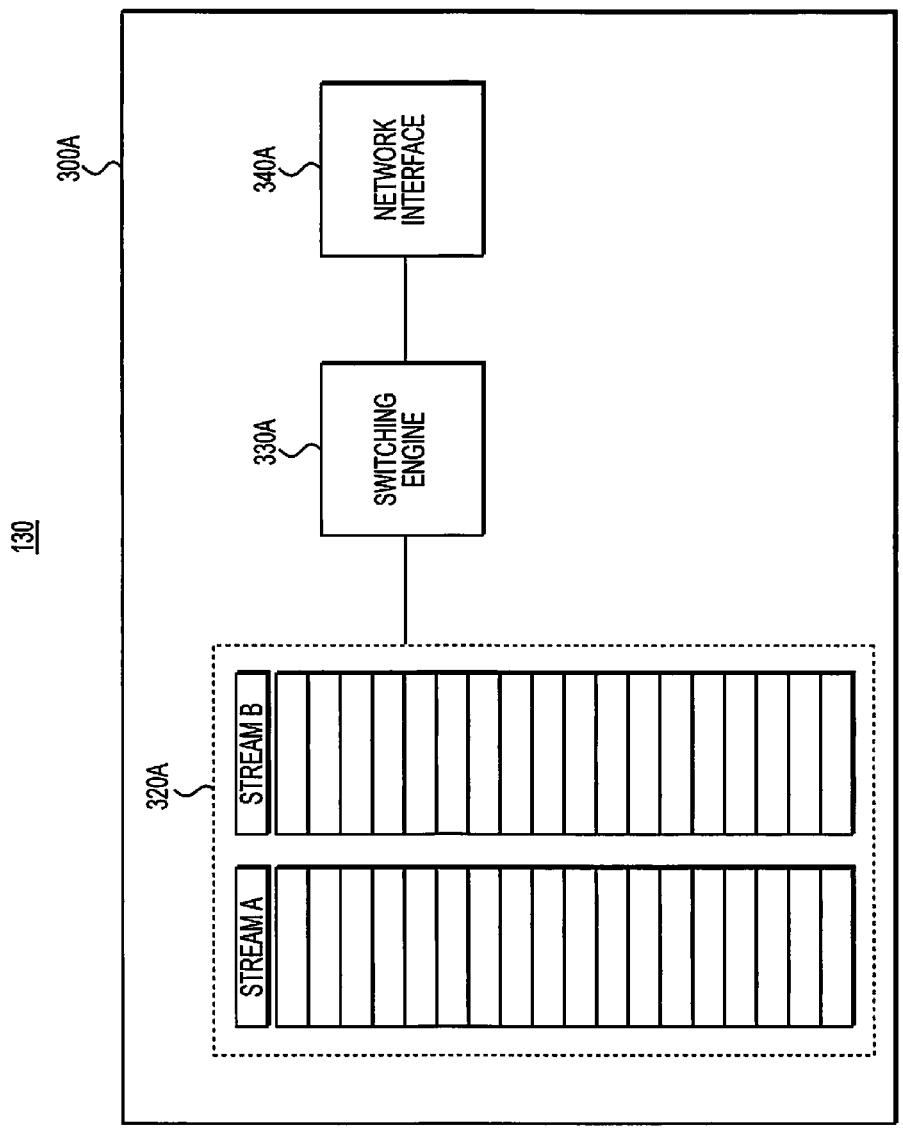

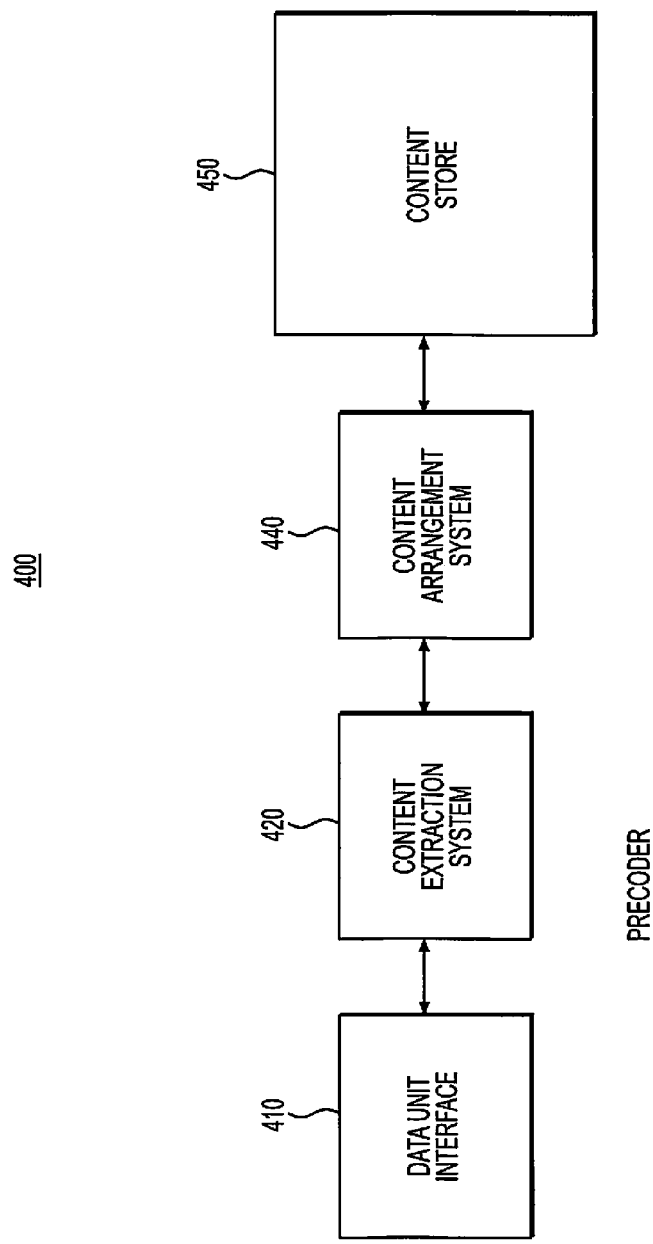

PERSONALIZED CONTENT

CROSS-REFERENCE TO RELATED APPLICATIONS

This application is a continuation of and claims the benefit of priority to U.S, application Ser. No. 11/563,663, filed Nov. 27, 2006 (now allowed), which is a continuation of U.S. application Ser. No. 10/329,766, filed Dec. 27, 2002 (abandoned). The contents of the above-referenced application are expressly incorporated herein by reference in their entireties.

This application also incorporates by reference U.S. Provisional Application No. 60/286,964, titled "Generating Multiple Data Streams from a Single Content Source" and filed Apr. 30, 2001; U.S. Provisional Application No. 60/343,182, titled "Duplicating Digital Streams for Digital Conferencing Using Switching" and filed Dec. 31, 2001; U.S. Provisional Application No. 60/373,329, titled "Stream Management" and filed Apr. 18, 2002; U.S. application Ser. No. 09/893,692, titled "Generating Multiple Data Streams from a Single Content Source" and filed Jun. 29, 2001; U.S. application Ser. No. 10/090,727, titled "A Duplicating Switch for Streaming Data Units to a Terminal" and filed Mar. 6, 2002; U.S. application Ser, No. 10/134,439, titled "Duplicating Digital Streams for Digital Conferencing Using Switching Technologies" and filed Apr. 30, 2002; and U.S. Application Ser. No. 10/134,552, titled "Managing Access To Streams Hosted on Duplicating Switches" and filed Apr. 30, 2002.

TECHNICAL FIELD

This application relates to networking.

BACKGROUND

Content may be distributed through a cable system by a cumbersome collection of tapes, modulators, and filters that may be referred to as legacy infrastructure. Generally, this legacy infrastructure poses challenges to the implementation of next-generation services. Typically, the legacy infrastructure maps content analogous to television station signals onto the spectrum of a cable. While content may be delivered through other delivery mechanisms, the legacy infrastructure represents an enormous investment, which makes a system capable of offering next-generation services through this legacy infrastructure desirable.

SUMMARY

In one general sense, requested content may be accessed by receiving a content request from a terminal for a first piece of content to be distributed over a cable system and identifying a personal channel within resources available in the cable system to distribute the first piece of content to the terminal. Access information may be transmitted to the terminal to enable the terminal to access the first piece of content through the personal channel. A cable headend may be interfaced with to provide the first piece of content on the personal channel.

Implementations may include one or more of the following features. For example, the personal channel may be dedicated to a single terminal and may include a modulated channel of the cable system. The personal channel may be accessed by tuning to a frequency and accessing data having a particular process identification number and transmitted at the frequency. The first piece of content may include non-video content. The first piece of content may be accessed by adding terminal address information to a list of addresses is supported by a broadcasting switch and/or an on-demand switch. Adding terminal address information to the list of addresses supported by the on-demand switch may include adding a play marker indicating the temporal location of the terminal in receiving the first piece of content.

Implementations may include a system and program capable of achieving the above features. Implementations also may include a sequence of steps performed on a media switch. The media switch may include a broadcasting switch and an on-demand switch. Other features will be apparent from the following description, including the drawings, and the claims.

DESCRIPTION OF DRAWINGS

FIG. 3A is an exemplary block diagram of a duplicating switch that uses memory to store a media stream for subsequent playback.

FIG. 4 is a block diagram of a precoder for use in a duplicating switch.

Like reference symbols in the various drawings indicate like elements. For brevity, several elements in the figures described below are represented as monolithic entities. However, as would be understood by one skilled in the art, these elements each may include numerous interconnected computers and components designed to perform a set of specified operations and/or dedicated to a particular geographical region.

DETAILED DESCRIPTION

In general, a media switch interfaces with a terminal across a cable system to enable personalized access to content.

When the media switch receives a content request for a first piece of content over the cable system, the media switch relates the content request to one or more available resources to determine if the content may be accessed from an existing resource. If the content request may be accessed from an existing resource, the media switch transmits access information to the terminal so that the terminal may use the existing resource to access the content indicated in the content request. If the content is not available from an existing resource, the content may be sent to the terminal over the cable system.

Also, a media switch may enable a terminal to access a personalized channel on a cable system. The media switch may receive a content request and enable the terminal to access the requested content over the personalized channel. The personalized channel may be created by exchanging location information (e.g., a frequency and a process identification number) indicative of where the terminal may access the personalized content on the cable system.

Figure 1:
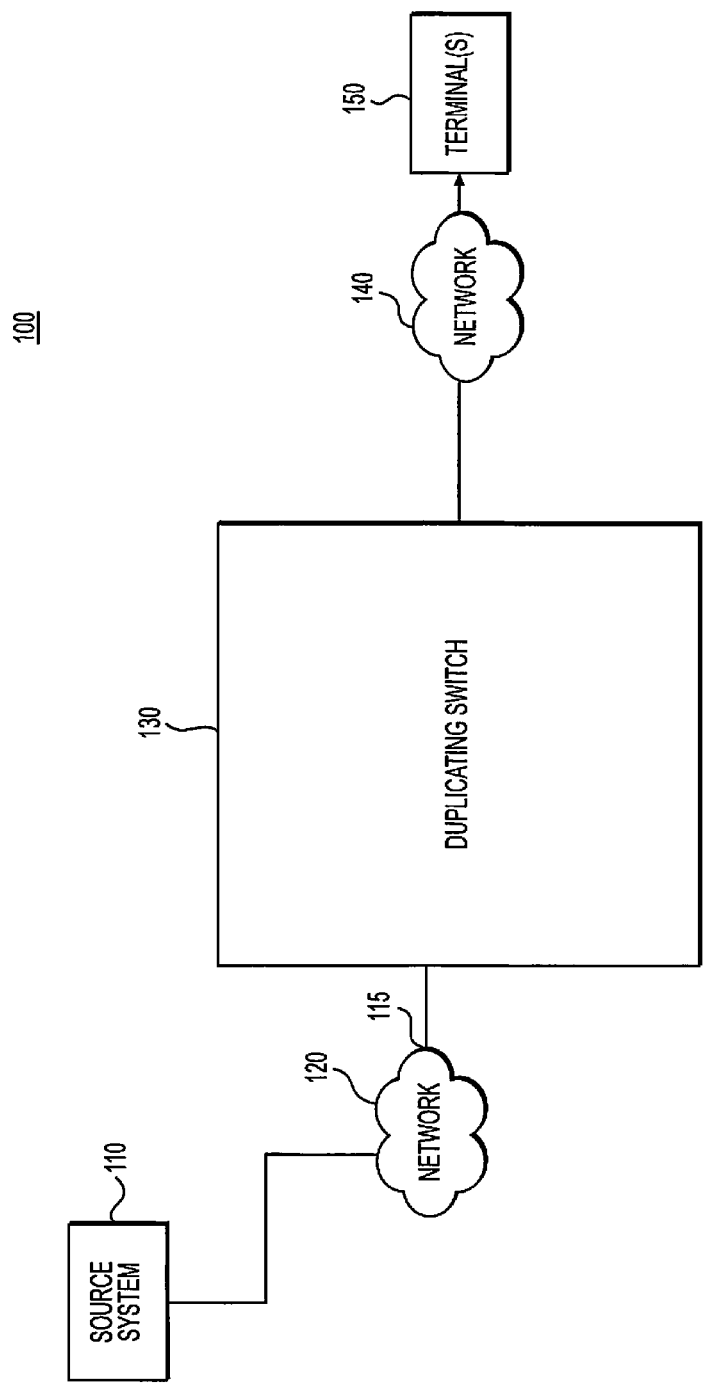
FIG. 1 is a block diagram of a communications system capable of using a duplicating switch to generate a stream of data units.

For illustrative purposes. FIGS. 1-8 describe a communications system that uses a duplicating switch to stream data units to a terminal. For illustrative purposes, FIG. 1 depicts a communications system 100 that implements techniques using a duplicating switch to stream data units to two or more terminals. Communications system 100 may be structured and arranged to include a source system 110, one or more terminals 150, and communication software and hardware that enable communications between source system 110 and terminals 150. More particularly, the communications system 100 typically includes the source system 110, a network 120, a duplicating switch 130, a network 140, and terminals 150. In actual implementations, the source system 110 generally transmits one or more data units in a stream of data units across network 120 to one or more duplicating switches 130. The duplicating switches store, duplicate and transmit content from the data units to one or more terminals 150 through network 140 in an on-demand manner.

The source system 110 provides the duplicating switch 130 with a stream of one or more data units across the network 120. Typically, the source system 110 is structured and arranged to convert a media source (e.g., a video or audio feed) into data units for transmission across the network 120. The source system 110 may include a general-purpose computer having a central processor unit (CPU), and memory/storage devices that store data and various programs such as an operating system and one or more application programs. Other implementations of the source system 110 include a workstation, a server, a device, a special purpose device or component, other equipment, or some combination thereof capable of responding to and executing instructions in a defined manner. The source system 110 also typically includes an input/output (I/O) device (e.g., video and audio input and conversion capability), and peripheral equipment such as a display communications card or device (e.g., a modem or a network adapter) for exchanging data with the network 120.

Implementations of the source system 110 also may include a media system that transmits one of more pieces of media content across a network 120. For example, a source system 110 may transmit across a network to a cable headend signals formatted according to European Telecommunications Standards Institute (ETSI), Digital Video Broadcasting (DVB), Advanced Television Systems Committee (ATSC), or European Cable Communications Association (ECCA) standards. In another implementation, a cable provider may transmit or direct video signals to a cable headend for distribution in a cable network.

A communications link 115 is used to communicate data between source system 110 and network 120. Communications link 115 may include wired or wireless modes of communication, such as a telephone line, a wireless network link, a cable network, or a direct connection.

The network 120 typically includes hardware and/or software capable of enabling direct or indirect communications between the source system 110 and the duplicating switch 130. The network 120 may include a direct link between the source system 110 and the duplicating switch 130, or it may include one or more networks or subnetworks between them (not explicitly shown). Each network or subnetwork may include, for example, a wired or wireless data pathway capable of carrying and receiving data. Examples of network 120 include the Internet, the World Wide Web, WANs ("Wide Area Network"), LANs ("Local Area Networks"), analog or digital wired and wireless telephone networks (e.g., PSTN ("Public Switched Telephone Network"), ISDN ("Integrated Services Digital Network"), or xDSL ("any form of Digital Subscriber Loop")), radio, television, cable, satellite, and/or other delivery mechanisms for carrying data.

Generally, the duplicating switch 130 is structured and arranged to store a received stream of data units for time-shifted transmission to more than one terminal. Implementations of the duplicating switch 130 may store one or more streams of data units. For example, the duplicating switch 130 may be capable of receiving a stream of IP ("Internet Protocol") video and storing that video for subsequent transmission. Implementations of duplicating switch 130 also may include hardware or software capable of transmitting or receiving media feeds not resembling a stream of data units. For example, the duplicating switch may include a cable headend system that is capable of receiving or transmitting signals formatted according to ETSI, DVB, ATSC, or ECCA standards for transmission on a cable distribution system. The cable headend system may receive a satellite broadcast feed, convert the feed into a format suitable for storage, and thereafter convert the feed back to a different format for time-shifted transmission.

The network 140 generally includes one or more of links between the duplicating switch 130 and the terminals 150. For example, the network 140 may include a direct physical link or a series of links connected by various pieces of network equipment. Generally, aspects of network 140 may resemble aspects of network 120. For example, network 120 and network 140 may share one or more hardware or software devices. In another example, networks 120 and 140 may use the same type of circuits and/or equipment.

The terminal 150 may include one or more devices capable of receiving the stream of data units transmitted by duplicating switch 130 through network 140. The terminal 150 may include a controller (not shown) that processes instructions received from or generated by a software application, a program, a piece of code, a device, a computer, a computer system, or a combination thereof, which independently or collectively direct operations of the terminal 150. The instructions may be embodied permanently or temporarily in any type of machine, component, equipment, storage medium, or propagated signal that is capable of being delivered to the terminal 150 or that may reside with the controller at the terminal 150. The terminal 150 may include a general-purpose computer (e.g., a personal computer) capable of responding to and executing instructions in a defined manner, a workstation, a laptop, a FDA ("Personal Digital Assistant"), a wireless phone, a component, other equipment, or some combination of these items that is capable of responding to and executing instructions.

For instance, in one implementation, the terminal 150 includes one or more information retrieval software applications (e.g., a browser, a mail application, an instant messaging client, an Internet service provider client, or an AOL TV ("America Online Television") or other integrated client) capable of receiving one or more data units. The information retrieval applications may run on a general-purpose operating system and a hardware platform at that includes a general-purpose processor and specialized hardware for graphics, communications and/or other capabilities. In another implementation, terminal 150 may include a wireless telephone running a micro-browser application on a reduced operating system with general purpose and specialized hardware capable of operating in mobile environments.

In another implementation, the terminal 150 may include a simplified device capable of receiving a video signal not encapsulated in a traditional data unit. For example, the duplicating switch 130 may transmit a raw video feed formatted in accordance with ETSI, DVB, ATSC, or ECCA standards for transmission directly to a cable tuner or television.

Figure 2:
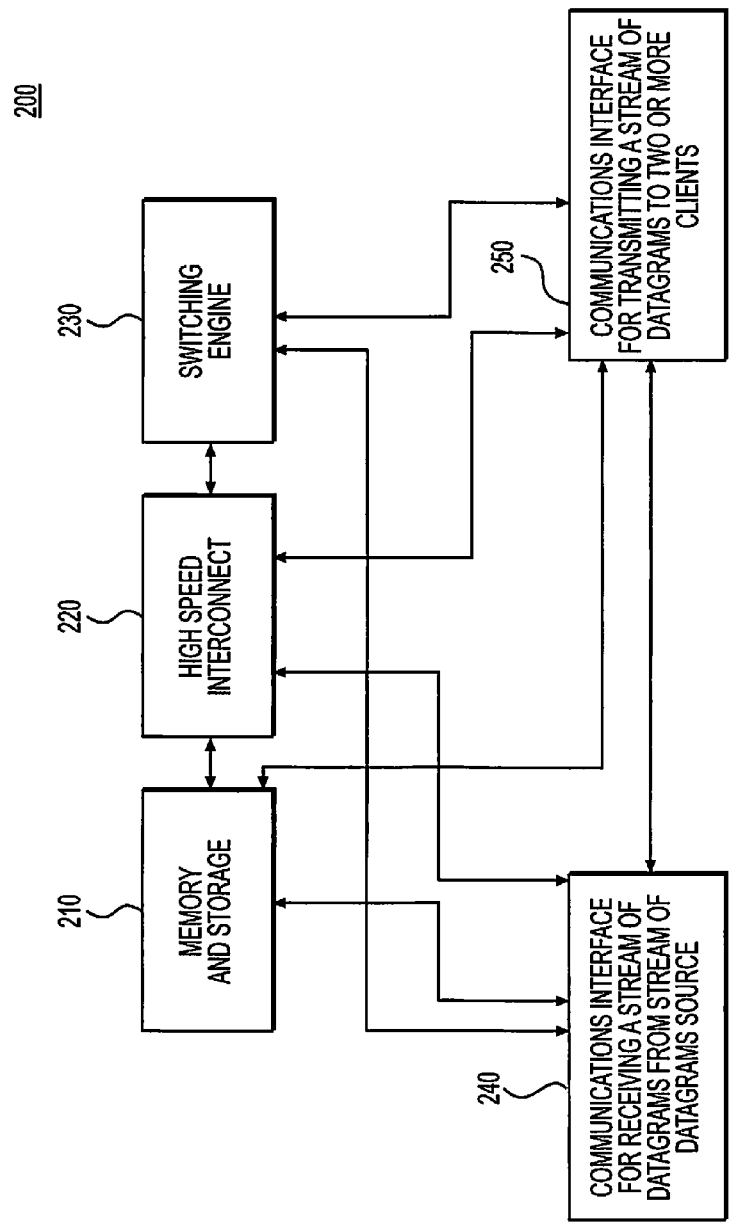
FIG. 2 is an exemplary component diagram of a duplicating switch suitable for use in the communications system of FIG. 1.

FIG. 2 illustrates a duplicating switch 200 structured and arranged to receive a stream, store content from the stream, generate data units from the stream, and transmit the generated data units as a stream. The duplicating switch 200 generally corresponds to the duplicating switch 130 in FIG. 1. The duplicating switch 200 generally includes a storage system 210 for storing the stream of data units, a high speed interconnect 220 between the various subsystems in the duplicating switch 200, a switching engine 230 for modifying and transmitting the stream of data units to two or more clients, a first communications interface 240 for receiving a stream of data units from a source system, and a second communications interface 250 for transmitting a stream of data units to two or more clients.

The storage system 210 enables the duplicating switch 200 to store at least the content portion of the data unit. The storage system 210 may be volatile or nonvolatile and may include memory (e.g., RAM) and/or storage (e.g., HDDS). Implementations of storage system 210 may include a hard disk drive or a more portable media, e.g., a compact disk, a tape drive, or an optical memory device. Implementations also may include combinations of memory and storage.

The high speed interconnect 220 generally refers to a device that connects a component of the duplicating switch 200 with other elements of the duplicating switch 200. Examples of the high speed interconnect 220 may include, but are not limited to, SCSI ("Small Computer Serial Interface"), Fibre Channel, UTOPIA ("Universal Test and Operations PHY interface for ATM ("Asynchronous Transfer Mode")), Infiniband, and other protocols and connection methods. The high speed interconnect may include physical, logical, timing and electrical connections and standards as well as protocols that enable these high speed interconnects to exchange data.

Generally, a switching engine 230 includes a device that performs network operations in hardware (e.g., a chip or part of chip). In some implementations, the switching engine 230 may include an ASIC ("Application Specific Integrated Circuit") implementing network operations logic directly on a chip (e.g., logical gates fabricated on a silicon wafer then manufactured into a chip). For example, an ASIC chip may include a logical gate structure implemented in silicon and configured to receive a packet and filter based on examining an IP address.

Implementations of the switching engine 230 may include a FPGA ("Field Programmable Gate Amy"). An FPGA generally is defined as a chip fabricated to allow third parties to implement a variety of logical designs (e.g., group of gates) on the chip. For example, one designer may load a design that replaces the IP address of received IP packets with a different IP address. Another example may include a design that performs segmentation and reassembly of IP packets as they are modified during transmission of the IP packet through different networks.

Implementations of the switching engine 230 also may include a network processor. A network processor generally is defined as a chip that, among other features, allows software to specify which network operations should be performed. One example of a network processor may include several interconnected RISC ("Reduced Instruction Set Computer") processors fabricated in a network processor chip. The network processor chip may implement on sonic of the RISC processors software that changes an IP address of an IP packet. Other RISC processors in the network processor may implement software that controls which terminals receive an IP stream.

The switching engine 230 may include a precoder (not shown) that is structured and arranged to receive a data unit, extract a content piece from the payload portion of the data unit, determine where the content piece will be stored, and store the content piece in a structured manner so that retrieval (e.g., playback) involves retrieving neighboring content pieces, packaging data units around the content pieces, and transmitting the data units to one or more requestors. This process will be described further with respect to FIG. 4.

The first communications interface 240 generally is structured and arranged to receive a stream of data units from a device such as the source system 110. Implementations of the communications interface may include a LAN or WAN interface with the ability to direct the data units to one or more locations in the duplicating switch 200, using, for example, the high speed interconnect 220. Implementations also may include other forms of transmitting a media signal, including transmission according to ETSI, DVB, ATSC, or ECCA standards.

The second communications interface 250 generally is structured and arranged to transmit a stream of data units from the memory system 210 to one or more devices that generally correspond with recipients, such as terminal 150 described with respect to FIG. 1. Implementations of the second communications interface 250 may include a LAN or WAN interlace with the ability to direct the data units to one or more locations in the duplicating switch 200 using, for example, the high speed interconnect 220. Implementations also may include other forms or transmitting a media signal other than by IP networking. In addition, the second communications interface 250 is not limited to the same type of format as the first communications interface 240, though the interfaces may include the same format and even the same physical interface. For example, the first communications interface 240 may include a POS ("Packet-over-SONET") interface while the second communications interface 250 may include some form of Ethernet (e.g., 100-Base-T or Gigabit Ethernet).

FIG. 3A provides an exemplary block diagram of a duplicating switch (e.g., duplicating switch 130 in FIG. 1) with a memory implementation. The duplicating switch 300A includes a RAM array 320A, a switching engine 330A and a network interface 340A.

The RAM array 320A may include one or more RAM memory banks structured and arranged to store one or more pieces of content. The RAM array 320A may store just a portion of the stream of data units. For example, a provider streaming out a movie may store one portion of the movie for several users to watch at one time. The RAM array 320A may store a window (e.g., a ten-minute window) of the movie that a user may use to time-shift the movie (e.g., pause, stop playing, or rewind) while staying current with the movie being broadcast.

Within the RAM array 320A, there may be location identifiers to monitor or indicate which content piece to package and/or transmit to a terminal. For example, an OSP ("Online Service Provider") may schedule a stream of data units to be transmitted to terminals at a certain time. In one example, the duplicating switch loads a portion of the stream of data units indicated by the location identifier to the RAM array 320A. In this example, the duplicating switch may use one or more pointers to indicate which data units (e.g., frames) should be transmitted to which user. In another example, an on-demand system may load a larger portion of the data units to memory and may use a first pointer to transmit one stream of data units and a second pointer to transmit a second stream of data units simultaneously or otherwise.

The switching engine 330A is structured and arranged to manage the content being stored in and retrieved from the RAM array 320A. Aspects of the switching engine 330A generally correspond to aspects of the switching engine 230 in FIG. 2. The switching engine 330A generally loads and retrieves content to/from the RAM array 320A. Examples of content that may be loaded and retrieved by switching engine 330A include content pieces without wrappers (e.g., OSI wrappers), such as datagrams having MPEG ("Motion Picture Experts Group") I, P, and B frames removed, video frames and differential checksum values that describe frame-to-frame changes, and frames with one or more added wrappers (e.g., a layer 4 datagram). In one implementation, the switching engine 330A may implement a system of pointers designed to monitor where in time or sequence number the terminals are with respect to the available stored content. The switching engine 330A may include a device, a program, a software controller, or another system or device in combination with the above. In another implementation, the switching engine 330A may manage overall system utilization and refuse subsequent requests for services or attempt to serve more than one terminal. from one stream of data units. The network interface 340A is designed to transmit and receive a stream of data units and generally corresponds to the first communications interface 240 and second communications interface 250 described in FIG. 2.

Figure 3B:
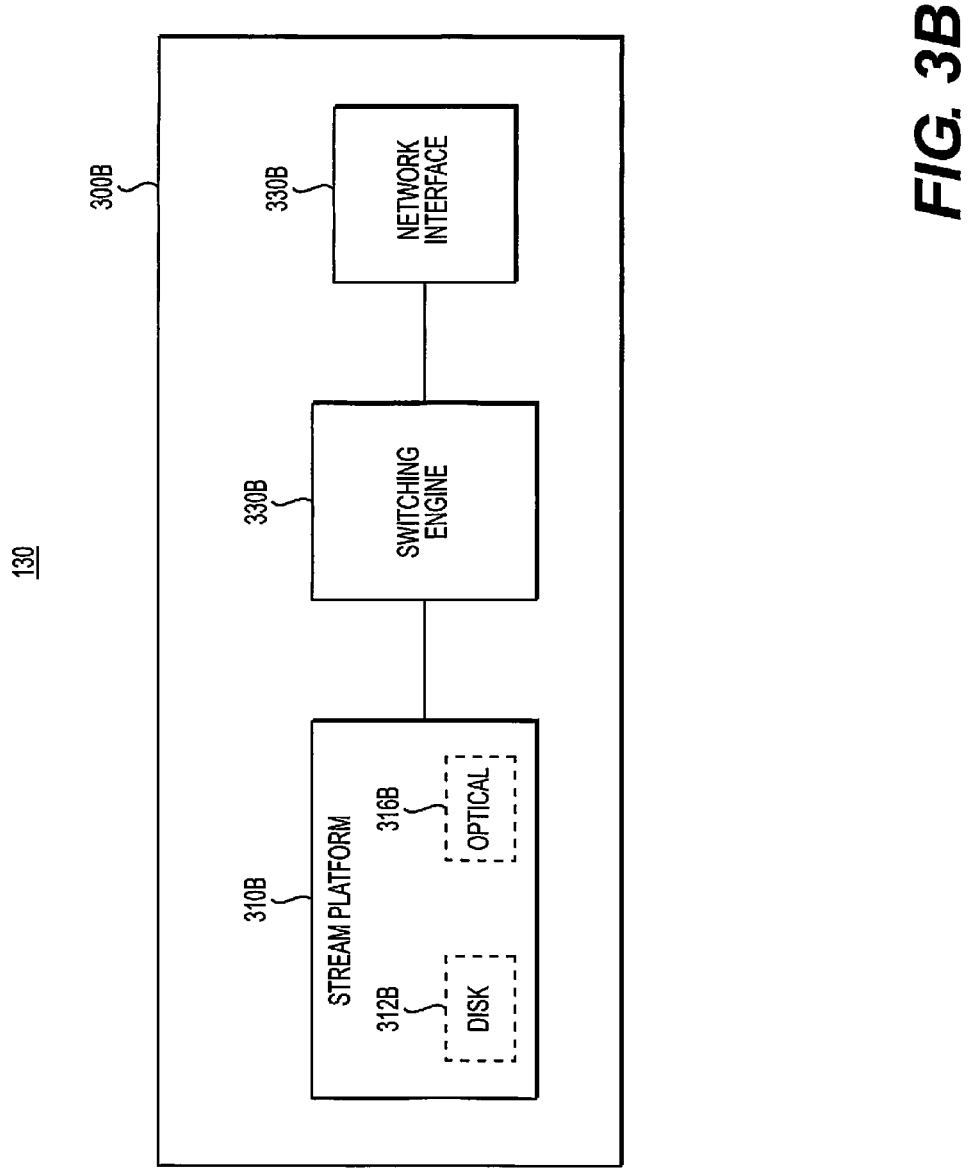
FIG. 3B is an exemplary block diagram of a duplicating switch that uses storage to store a media stream for subsequent playback.

FIG. 3B provides another exemplary block diagram of a duplicating switch 300B with a storage implementation. The duplicating switch 300B includes a stream platform 310B, a switching engine 330B, and a network interface 340B.

The stream platform 310B is structured and arranged to store content from within a stream of data units. The stream platform 310B includes a hard disk drive 312B (or a tape drive or other magnetic memory) and optical memory 316B. Generally, the stream platform 310B includes memory components with low bandwidth performance but high capacities. For example, storage may include solid-state-memory (not shown) that is slower than solid-state memory used in other applications. Typically, because of the greater storage available with less bandwidth, the stream platform 310B will store a larger portion of a stream (e.g., a movie), but will limit access to fewer simultaneous streams absent RAM or other cache interfaces.

Implementations of the storage platform 310B may include the disk storage 312B with a RAM interface to the switching engine 330B. For example, the duplicating switch may include a RAM bank and disk storage. Content pieces may be loaded to the disk storage such that the content pieces are retrieved in the order that they are transmitted. As the content pieces are being retrieved, they are loaded to the RAM bank. The higher throughput performance of the RAM banks may enable more terminals to access the same content piece. Terminals accessing the stream of data units may use a pointer to the content pieces in the RAM bank to monitor and load the data units they need in the stream of data units.

The switching engine 330B is structured and arranged to manage the content being stored and retrieved in the stream platform 310B. The switching engine 330B generally corresponds to the switching engine 330A described with respect to FIG. 3A. The network interface 340B is designed to transmit and receive a stream of data units and generally corresponds to the first communications interface 240 and second communications interface 250 described with respect to FIG. 2.

The RAM-based and storage-based systems described with respect to FIGS. 3A and 3B illustrate implementations that are designed to account for common limitations of existing memory and storage systems (e.g., solid-state RAM offers high throughput but less storage while hard drives and optical memory offer higher storage but less throughput). However, implementations are not limited to those shown, nor are memory or storage devices necessarily subject to these constraints. For example, a disk drive may be used to implement a system managing multiple pointers and may offer higher bandwidth, while solid-state memory may offer higher density storage than the disk drive storage.

FIG. 4 shows an example of a duplicating switch 400 with precoder functionality. The duplicating switch 400 generally corresponds to the duplicating switch 130 of FIG. 1. The duplicating switch 400 includes a data unit interface 410, a content extraction system 420, a content arrangement system 440, and a content store 450.

The data unit interface 410 generally is structured and arranged to interface with a network to transmit and receive a data unit from the content store 440. Generally the functionality of the data unit interface 410 corresponds to the functionality of the first communications interface 240 and the second communications interface 250 of FIG. 2. Data unit interface 410 also may be configured to segment and reassemble a data unit that has been separated during transmission, or to handle unconventional data units. For example, the data unit interface 410 may be configured to transmit/receive one or more media frames (e.g., frames formatted according to one of the ETSI, DVB, ATSC, or ECCA standards). In one instance, if the duplicating switch 400 receives an analog signal, the data unit interface 410 may convert the signal to a recognized format that the frame or content piece may store.

The content extraction system 420 is structured and arranged to remove a data unit wrapper that is added around content for transmission. For example, the content extraction system 420 may remove one or more bits associated with OSI ("Open Systems Interconnect") information encapsulated along with the content for transmission. The content extraction system 420 also is capable of adding the wrapper when the data is retrieved from the content store 450 for subsequent transmission. For example, the content extraction system 420 may remove wrapper information when storing a stream of data units in the content store 450 and may add a different wrapper when transmitting the stream of data units from the content store 450.

The content arranger 440 is structured and arranged to direct storage and retrieval of the content information such that the content information may be retrieved in a determinate manner. For example, the content may be arranged so that the addressing information may be updated in predictable increments. In another example, the content may be arranged such that the difference between frames of content may be calculated by analyzing an associated checksum that then may be stored.

Determining where a content piece may be stored and storing the content piece may include using hard disk drive constraints to store the content piece. For example, the content store 450 (e.g., hard drive) may store the content pieces such that the same "read" or data retrieval will retrieve related content pieces that are frequently transmitted in close proximity to one another (e.g., adjacent frames in a movie or adjacent I, P, and B MPEG frames).

Determining where a content piece may be stored and storing the content piece may include using solid-state storage (e.g., various forms of RAM) to store the content piece. For example, the solid-state storage may store all or a portion of the stream in an array of RAM memory. If a portion of the RAM memory is used to store the content piece, the RAM may load a certain window of content for transmission to one or more terminals. In some implementations, the duplicating switch may store more than one instance of the stream of data units in the array of RAM.

The content store 450 is structured and arranged to store content pieces or frames. As described above with respect to the content arranger 440, the content is generally structured and arranged to be retrieved in a manner enabling transmission of related content pieces to one or more terminals. The content store 450 generally corresponds to the memory system 210 of FIG. 2, the RAM array 320A of FIG. 3A, and the storage platform 310B of FIG. 3B.

Figure 5:
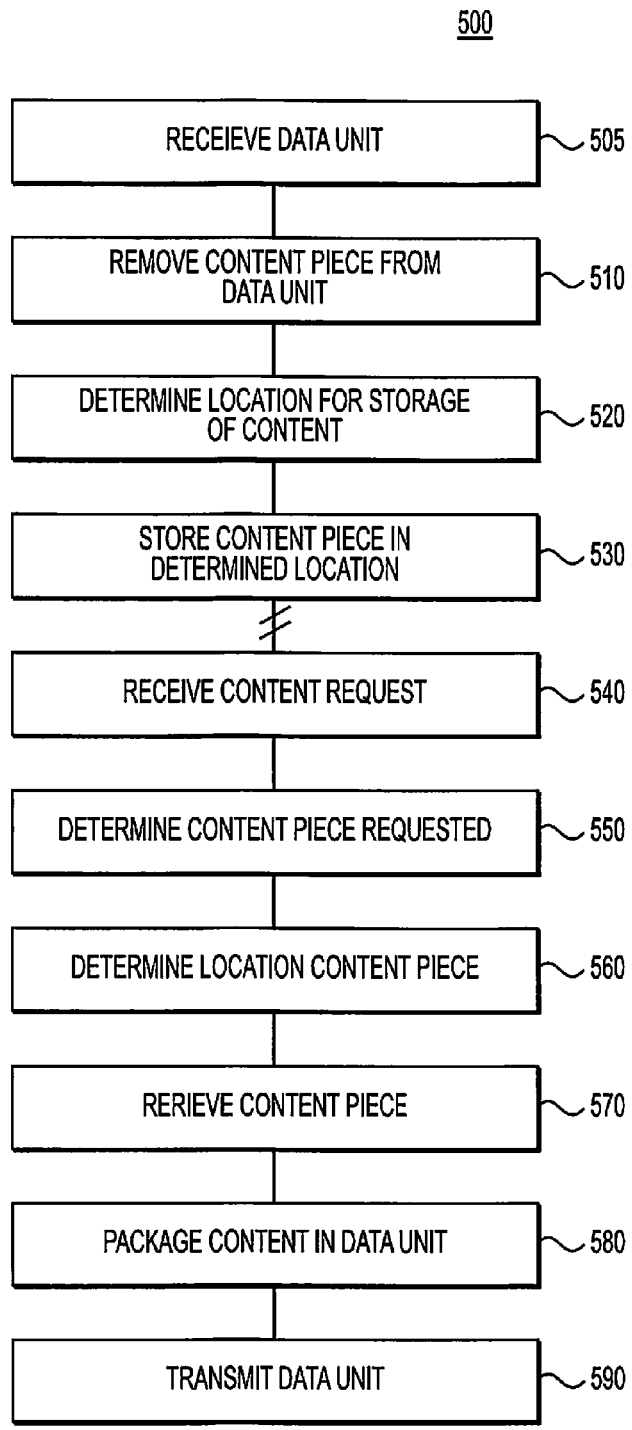
FIG. 5 is a flow chart of a procedure for processing a received data unit using a duplicating switch in a communications system, such as the communications system of FIG. 1.

FIG. 5 illustrates a procedure 500 for storing and transmitting a data unit using a duplicating switch. In general, the procedure 500 may be performed using one of the duplicating switches described with respect to FIGS. 1-4.

Initially, the duplicating switch receives a data unit (step 505) and selects the content piece from the data unit (step 510). Typically, selecting the content piece of the data unit (step 510) involves identifying fields or portions of the data unit that correspond to the content, and removing some or all aspects not related to the content. For example, a duplicating switch may remove one or more layers of an OSI ("Open Systems Interconnection") header and store the remainder of the data unit as the content piece. In another example, selecting the content may include creating or modifying location identifiers to identify which portion of the data unit should be stored when the data unit is loaded to memory.

Selecting the content (step 510) may include enabling one or more portions of other aspects of the data unit to be retained with the content. For example, one or more fields of the OSI header may be preserved and stored as content.

Implementations may include using a pre-coder to modify or adjust the content for storage. For example, the pre-coder may compress the content so that less bandwidth is consumed during transmission. In another example, the pre-coder may calculate a checksum or shortcut describing intra-content differences. This checksum or shortcut may be stored in place of storing some of the content pieces.

The duplicating switch determines the location in the memory system in which to store the content piece (step 520). Typically, the location for storage of the content piece is selected so that related content pieces may be retrieved in related operations. Examples of related content may include sequential frames in a video and/or content in a time slice. The duplicating switch then stores the content piece in the determined location (step 530).

At some later time, the duplicating switch receives a request for a content piece (step 540). Receiving a request for a content piece may include receiving a user (e.g., terminal 150 in FIG. 1) request display of a video stream on the user's home computer. Implementations also may include having other devices request the content piece. For example, a cable modem acting as a set top box may request a content piece for display to a television.

Implementations also may include having a request originate from a source other than the intended destination. For example, a cable system administrator may generate a request for the content piece on behalf of one or more subscribers.

The duplicating switch 130 determines which content piece has been requested (step 550). The requestor may designate a content piece to send. For example, a terminal may keep track of which content has been received, and may generate a request for one or more pieces of content (e.g., frame number 100 is missing). Implementations also may include having the duplicating switch track which content piece is required. For example, a duplicating switch may attempt to transmit the same content piece to several users.

The duplicating switch 130 determines where the content piece is located (step 560). To do so, the duplicating switch may use the location identifiers described with respect to FIGS. 2 and 3. Other implementations may employ a file and/or an archiving system maintained to manage access to content pieces.

The duplicating switch 130 retrieves the content piece (step 570). The duplicating switch may do so by reading a memory location specified by a location identifier. Other implementations may include retrieving multiple pieces of content information (e.g., reading a sector on a disk).

The duplicating switch 130 packages the content piece in a data unit (step 580). For example, the duplicating switch may add one or more layers of OSI information (e.g., addressing information). Implementations where one or more aspects of the data unit other than content are stored with the content piece may include modifying one or more parameters in those fields. For example, if an Internet Protocol packet is stored, the destination address may be modified to the addresses of requesting users.

Finally, the duplicating switch transmits the data unit to one or more terminals (step 590). The data unit may be transmitted in formats other than IP addressing. For example, transmitting the data unit may include transmitting an on-demand channel over a network.

Figure 6:
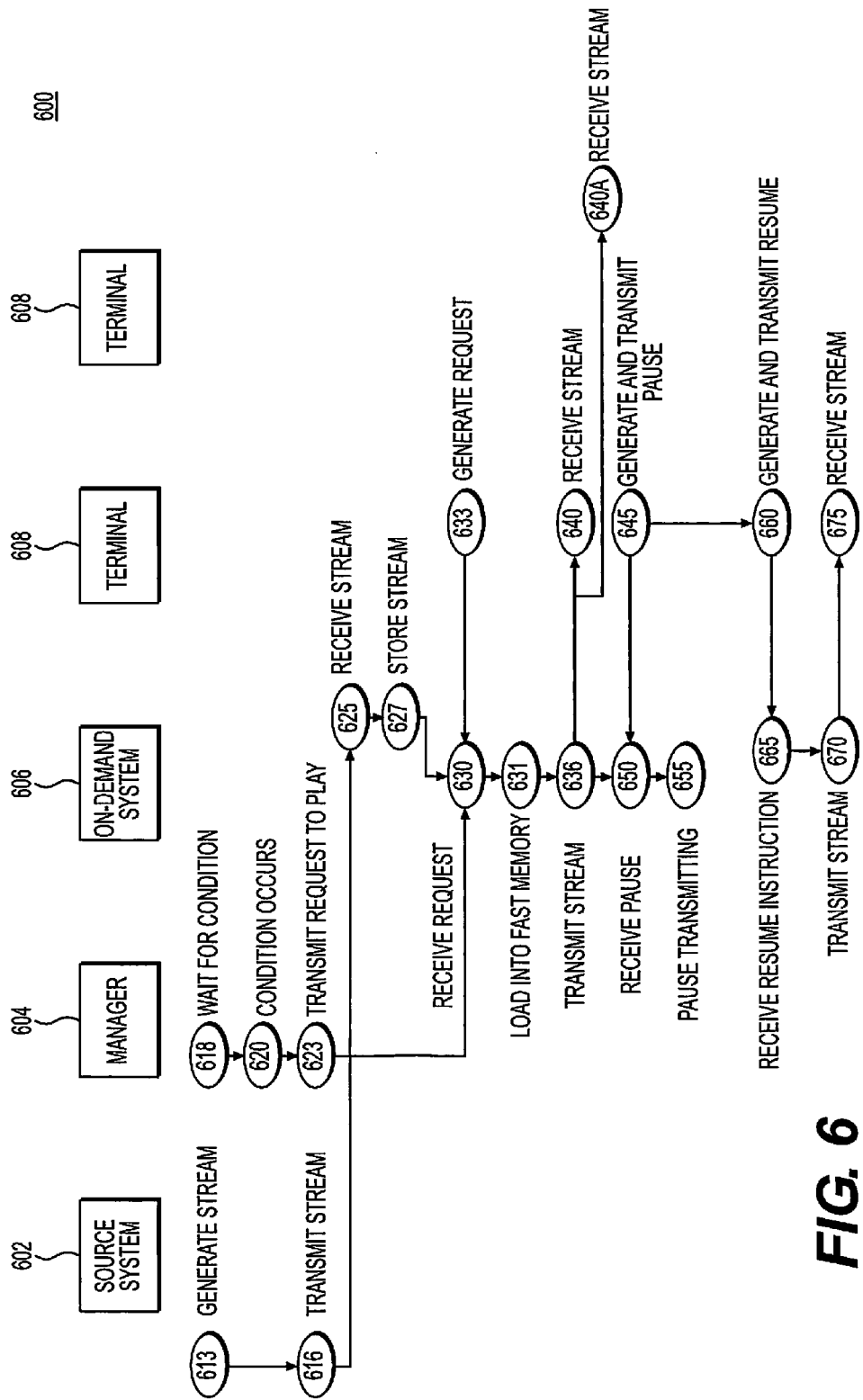
FIG. 6 is a flow chart of a procedure for providing a stream of data units in a communications system, such as the communications system of in FIG. 1.

Referring to FIG. 6, the function of a communications system 600 will now be described. Communications system 600 generally includes a source system 602, a manager 604, a duplicating switch 606, and terminals 608 and 610. In general, the source system 602 corresponds to the source system 110 of FIG. 1, duplicating switch 606 corresponds to duplicating switch 130 in FIG. 1, and terminals 608 and 610 correspond to terminals 150 of FIG. 1. The manager 604 may include a cable system operator, an OSP, a content provider, or an entity capable of providing instructions or direction to the duplicating switch 606.

As shown, the source system 602 generates a stream of data units (step 613). The source system 602 transmits the stream of data units to the duplicating switch 606 (step 616).

The duplicating switch 606 receives the stream of data units (step 625). The duplicating switch 606 then stores at least the content pieces from the stream of data units (step 627).

The stream may be transmitted in a variety of ways. In sonic implementations, the manager 604 waits for a condition to occur (step 618). For example, the manager may be a scheduler that is programmed to direct a duplicating switch "broadcast." When the condition occurs (step 620), the manager 604 transmits a request to the duplicating switch 606 to so transmit the stream of data units (step 623).

Alternatively, a terminal 608 may generate a request for a stream (step 633). For example, the terminal 608 may generate a request to view a particular video stream. The duplicating switch 606 receives the request (step 630).

In an implementation generally corresponding to the system described with respect to FIG. 3B, the duplicating switch 606 may load one or more content pieces into fast memory (e.g., RAM) (step 631). For example, the duplicating switch 606 may determine that there is inadequate bandwidth to the existing storage of the content and may load frequently-accessed content pieces to the faster memory to increase capacity.

Regardless of the mechanism used to indicate when to transmit the stream of data units to a terminal, the duplicating switch 606 may transmit the stream of data units to two or more terminals 608, 610 (step 636). In some implementations, a terminal receives a stream that has been broadcast or otherwise automatically transmitted to the stream recipient without requesting the stream of data units. In either case, terminals 608 and 610 receive the stream of data units (step 640 and 640A). Depending on the implementation, a different "stack" of content pieces may be loaded into memory to support terminal 610.

In some implementations, the terminal 608 may generate and transmit a pause message (step 645). For example, a terminal may wish to "pause" a video on-demand stream and return to the stream at a later point. When the duplicating switch 606 receives the pause message (step 650), the duplicating switch 606 pauses transmitting to the terminal 608 (step 655). The duplicating switch 606 may still transmit a stream of data units to terminal 610 (not shown). The pause message may be implemented in a variety of ways. For example, terminal 608 may keep track of which data units have been received and resume where it left off by generating and transmitting a resume message (step 660). Another example may include having the terminal 608 transmit a stop message and the duplicating switch 606 keep track of where to resume when the transmit resume message is received (step 660).

If and when the duplicating switch 606 receives the resume message (step 665), the duplicating switch 606 transmits the stream of data units 670 to the terminal (step 670). The terminal 608 then receives the stream of data units (step 675).

Figure 7A:
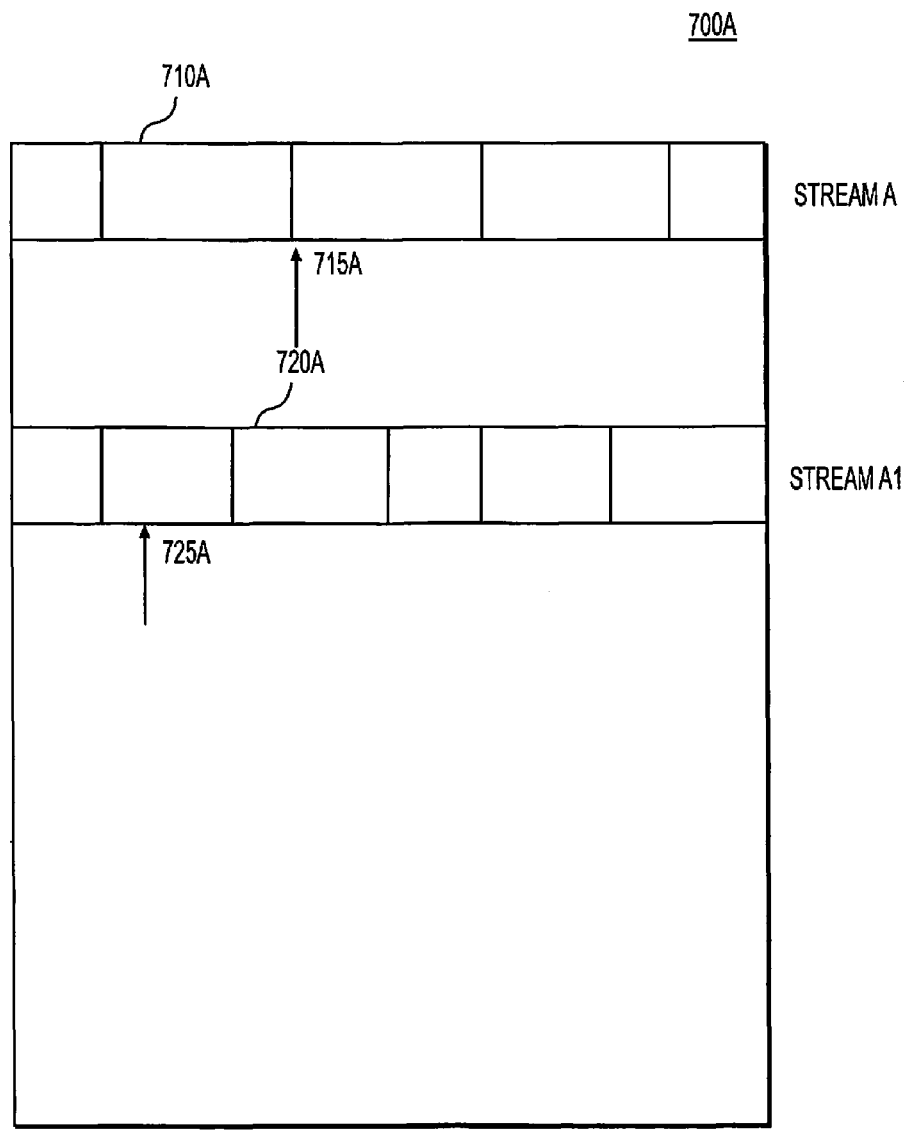
FIG. 7A illustrates a duplicating switch structured and arranged to store multiple instances of a stream of data units.

FIG. 7A depicts a duplicating switch 700A structured and arranged to store multiple instances of the stream of data units. The duplicating switch 700A transmits two streams of data units, stream A and stream A1. Stream A occupies memory storage 710A in the memory bank, while stream A1 occupies memory storage 720A in the memory bank. In one implementation, a first pointer 715A to the memory storage 710A indicates which content piece, relative to other content pieces, should be encapsulated as a data unit and transmitted to a terminal requesting Stream A. As mentioned previously, implementations may include storing a portion of the content pieces in the memory bank. For example, if problematic network conditions prevent a terminal from receiving some of the stream of data units, the terminal may not receive some of the content pieces and may experience gaps in receiving the stream of data units (e.g., missing time in a movie).

A second pointer 725A to the memory storage 720A indicates which portions of content pieces encapsulated in a stream of data units are being transmitted to several terminals. One or more terminals wishing to receive one or more data units in the stream of data units receive the content piece corresponding to the second pointer 725A, which is continuously advanced to the next content piece. In some implementations, the second pointer 725A may advance several content pieces and encapsulate more than one content piece in a data unit.

Figure 7B:
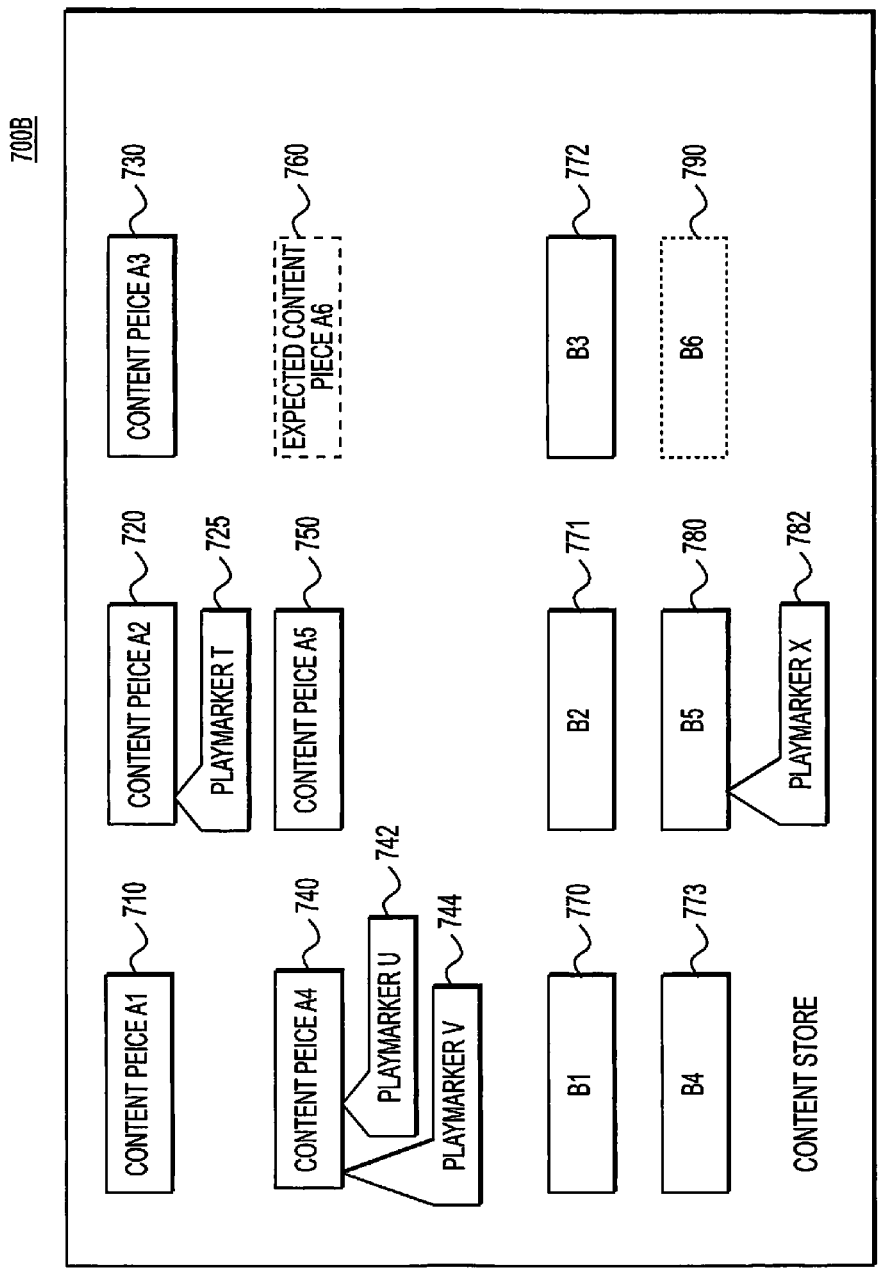
FIG. 7B illustrates a duplicating switch structured and arranged to store multiple location identifiers.

FIG. 7B depicts a duplicating switch 700B structured and arranged to store multiple location identifiers. In this example, duplicating switch 700B includes five content pieces in stream A: A1 710, A2 720, A3 730, A4 740, and A5 750. Duplicating switch 700B also includes an area of memory allocated for an expected content piece A6 760.

In one example, the duplicating switch 700B enables each of terminals T, U and V to receive its own stream of data units. Each of the terminals manages a location identifier (e.g., pointer) to direct the duplicating switch to select the appropriate content piece to be transmitted. For example, terminals T, U, and V may begin by requesting content piece A1 710 simultaneously.

After some content pieces have been transmitted, and as shown in FIG. 7B, the location identifier 725 for terminal T may be referencing content piece A2 720, while the location identifier 742 and the location identifier 744 for terminals U and V are referencing content piece A4 740 that corresponds to a different time-shift than content piece A2. This offset may have occurred because, for example, terminal T paused receipt of the stream of data units, and is now receiving content pieces that are delayed relative to those received by terminals U and V.

In another example, duplicating switch 700B includes five content pieces in stream B: B1 770, B2 771, B3 772, B4 773, and B5 780. Duplicating switch 70013 also includes an area of memory allocated for an expected content piece B6 790. In one implementation, stream B may be part of the same stream of data units as stream A, but may correspond to a different portion of the stream of data units. For example, stream A may be a "video" stream 40 minutes into a video stream while stream B is five minutes into the same video stream. In another example, stream B may be identical to stream A but was added to implement better system performance. In yet another example, stream A and stream B may represent completely different video streams (e.g., two different television channels).

Figure 8:
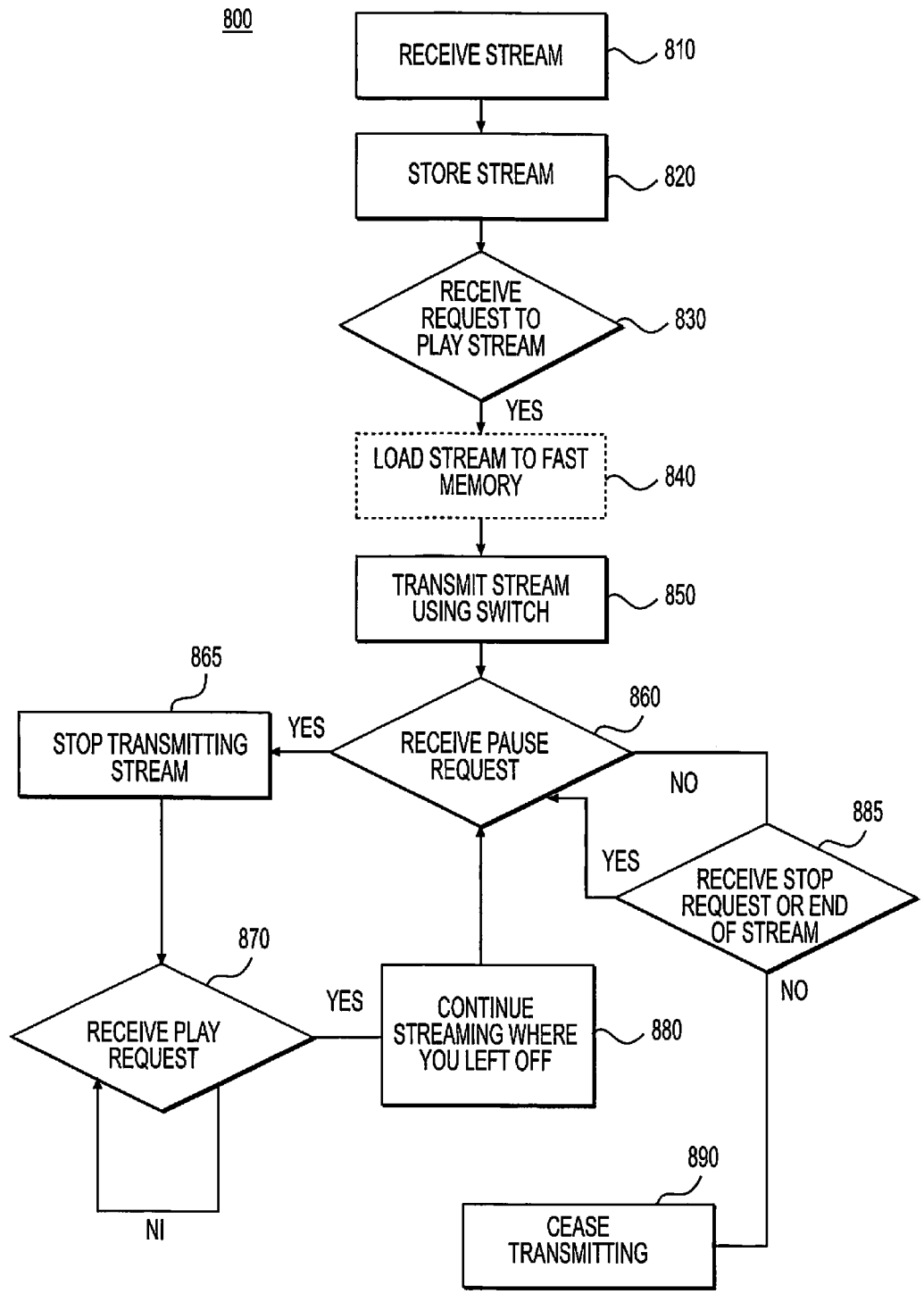
FIG. 8 is a flow chart of a procedure for time-shifting content in a communications system, such as the communications system of FIG. 1.

FIG. 8 illustrates a procedure 800 for implementing a "Pause" function on a duplicating switch, such as the duplicating switches described with respect to FIGS. 1-7. Initially, the duplicating switch receives a stream of data units (step 810) and stores content pieces from the stream of data units (step 820). With the content stored and ready for transmission, the duplicating switch waits to receive a request to play the stream of data units (step 830). Though the duplicating switch may wait for a request-to-play message, in some implementations, the duplicating switch may begin to transmit (e.g., play) upon receipt of the stream. In this configuration, the content might only be stored when a user requests pausing of the stream.

In an optional implementation, the duplicating switch may load the stream (content pieces) to fast memory (step 840). This generally corresponds to loading the stream to fast memory as described with respect to FIG. 6.

The duplicating switch transmits the stream of data units (step 850). While transmitting the stream, the duplicating switch 130 may receive a pause request (step 860). If the duplicating switch 130 receives a pause request, the duplicating switch stops transmitting the stream of data units to the terminal (step 865). With the stream of data units paused, the duplicating switch 130 may wait to receive a play request (step 870).

If the play request is received, the duplicating switch 130 continues to transmit the stream of data units where the terminal left off (step 880). If not, the duplicating switch 130 waits for the resume request. When the terminal resumes receiving the stream of data units, the duplicating switch checks for a new pause request (step 860).

If the duplicating switch 130 does not receive a pause request, the duplicating switch may receive a stop request or reach the end of the stream (step 885). If the stop request is received or the end of the stream of data units is reached, the duplicating switch ceases transmitting (step 890). If not, the duplicating switch 130 continues transmitting and returns to waiting for a pause request (step 860).

Figure 9:
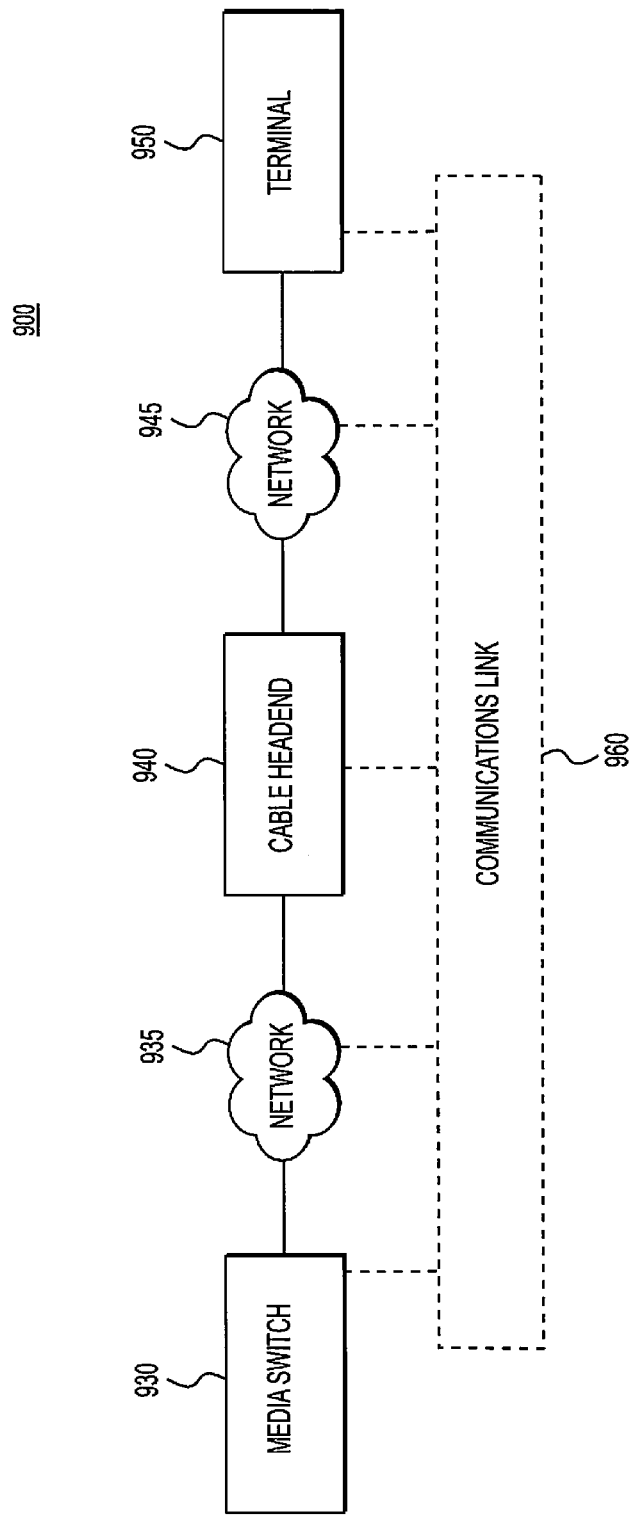
FIG. 9 is a diagram of a cable system that may be used to distribute personalized content through a cable system.

Referring to FIG. 9, a cable system 900 enables a media switch 930 to transmit content (e.g., video) to a terminal 950. The media switch 930 is connected through a network 935 to cable headend gear 940, which is connected through a network 945 to the terminal 950. Aspects of cable system 900 generally relate to aspects of the communications systems described previously with respect to FIGS. 1-8. However, FIG. 9 illustrates how aspects of the duplicating switch described previously may be used in a media switch in the context of a cable system. Specifically, cable system 900 may enable access to terminal-specific content through a cable system, for example, by mapping content onto frequency/process identification numbers used by the cable system and exchanging the access information with the terminal.

Generally, media switch 930 includes aspects of a duplicating switch, such as the switch 130 illustrated in various of FIGS. 1-8, which is configured to interface with the cable headend 940 and the terminal 950 to enable access to content. Typically, media switch 930 includes communications interfaces that may be used to send and receive content. For example, the media switch 930 may receive content from an upstream node (e.g., a source system 110). This received content may be transmitted to other devices (e.g., PCs (not shown in FIG. 9), cable headends 940, and terminals 950). The received content also may be stored to enable on-demand access to the content.

The media switch 930 is not limited to video content. For example, the media switch 930 may include audio content for cable-based radio stations, text and imaging content for displays and slide shows, and overlay content to be displayed with video content and/or as an alternative to the video programming.

The network 935 may include one or more communications paths between the media switch 930 and the cable headend 940. Generally, aspects of the network 935 may relate to aspects of the networks 120 and 140 described previously. However, network 935 may be configured to address one or more issues arising in the context of distributing content to a cable headend 940. For example, network 935 may use certain transmission parameters (e.g., to control jitter, quality of service, and/or comply with reception requirements of the cable headend 940). Other aspects relating to interfacing with a cable headend 940 may include channelization control and/or scheduling. For example, a piece of content may be configured. as an IP stream so that minimal processing is required to map the IP stream into the feed transmitted over the cable system.

Cable headend 940 typically is structured and arranged to receive a stream of content from the media switch 930 and to transmit the content across the network 945 to the terminal 950. This may involve mapping received streams of content to a system of channels used by a set top box. For example, in the case of QAM (Quadrature Amplitude Modulation), the content may be mapped to a frequency/PID ("Process Identification Number") pair. A set-top box accessing the cable system may know that a particular pair (e.g., 1/112) corresponds to a particular channel (e.g., channel 2). While another pair (e.g., 3/115) corresponds to another channel (e.g., channel 45). In this manner, the appearance of "channels" may be maintained for users, independent of the underlying cable system.

Typically, network 945 includes part of a cable system from which the terminal 950 may access a cable signal. For example, the cable signal may distribute 100 channels for a consumer to access. The cable system may include one-way and two-way communications. To illustrate, a portion of the available bandwidth may be allocated for high-speed Internet access to enable a terminal to send and receive data. In another illustration, the channel may include a one-way video signal being distributed to set-top boxes.

Typically, the terminal 950 enables a consumer to access a cable system (e.g., via network 945) to receive content. Examples of the terminal 950 may include a set-top system, a tuner, a personal computer, and an Internet access device. The terminal 950 may include a proxy and one or more other access devices behind the proxy. For example, a consumer may have a tuner system that demultiplexes a signal and sends content signals to one or more home appliances (e.g., a television).

Generally, the terminal 950 is configured to select a channel of content within the overall group of channels. For example, a terminal 950 may select a particular frequency/PID pair (e.g., 1/112) to access a particular television channel (e.g., channel 2). The tuner 950 generally is able to exchange data with one or more other systems (e.g., media switch 930 or cable headend 940).

One example of the communications capability may include accessing the communications link 960. The communications link 960 may use the same communications channel as the content being distributed (e.g., in-band communications), or it may include out-of-band communications. For example, an in-band communications link 960 may include having the terminal 950 use a cable channel dedicated to Internet access to transmit content requests to the media switch 930 and/or the cable headend 940, for example, through networks 935 and 945. An example of an out-of-band communications link may include a modem that accesses a phone line and/or a wireless modem designed to access a wireless network (e.g., a TDMA ("Time Division Multiple Access") or 802.11 (b) network).

The communications link 960 may interface through one or more intermediate devices to access the other systems. For example, the cable headend 940 may act as a proxy for communications from the terminal 950 to the media switch 930. The cable headend 940 may receive communications formatted in a first protocol and convert them to a second protocol for transmission on the network 935.

Figure 10:
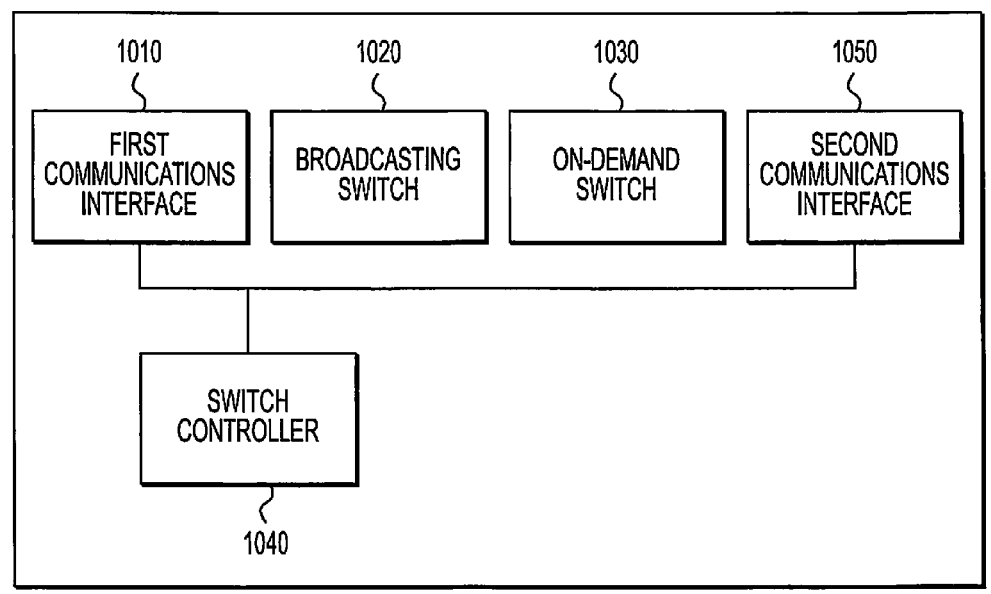
FIG. 10 is a block diagram of a media switch that may enable access to personalized content in a cable system.

FIG. 10 is a block &again of media switch 930. Media switch 930 includes a first communications interface 1010, a broadcasting switch 1020, an on-demand switch 1030, a switch controller 1040, and a second communications interface 1050. In general, the media switch 930 is configured to access content from a content source and to enable one or more terminals to access the content in real-time and/or on-demand.

Generally, the first communications interface 1010 accesses one or more sources of content for the media switch 930. In one example, the first communications interface 1010 is a software controller that pulls content from a source system. In another example, the first communications interface 1010 is configured to receive pushed content.

The first communications interface 1010 may include a data network interface (e.g., an Ethernet interface), or it may include media-oriented interfaces. For example, the interface may be configured to receive MPEG2 content from a satellite.

The broadcasting switch 1020 typically is configured to enable real-time or near real-time access to media content. For example, the broadcasting switch 1020 may receive a feed and may transmit the content to several devices. In general, the label "broadcast" refers to the real time nature of the content, rather than the ability of the content to be seen by more than one terminal (e.g., an IP multicast). However, depending on the configuration of the cable system, the broadcast content may be seen by more than one user.

The on-demand switch 1030 enables on-demand access to stored content. For example, premium content involving additional costs may be stored to a disk drive. Access to this content on the disk drive may be managed through a collection of location identifiers that each indicate the location at which one terminal receives the content. If a user wishes to pause a feed, the location identifier may be stopped at its present location so that the content may be subsequently accessed at the same point when the user wishes to resume.

Typically, the switch controller 1040 may be used to control the systems in the media switch 930. For example, the switch controller 1040 may include a scheduling program to coordinate timely delivery of content to other devices, such as, for example, the cable headend 940. This scheduling program may enable stored on-demand content to be sent out as "live content" by coordinating a nearly simultaneous delivery of stored content to the cable headend 940. Thus, the stored content can be mapped into predefined channels so that a user can time in to the advertised channel at the advertised time. Similar scheduling also may be performed using the broadcasting switch 1020.

The switch controller 1040 also may interface with one or more off-device systems. For example, the switch controller 1040 may interface with a terminal 950 to receive content requests. In another example, the switch controller 1040 may interface with a cable headend 940 to control frequency/PID mappings.

Typically, the second communications interface 1050 exchanges data with a cable headend 940 and/or terminal 950. For example, the media switch 930 may use the second communications interface 1050 to transmit content to cable headend 940 for distribution to a terminal 950. in another example, the second communications interface 1050 may receive content requests from the terminal 950.

Figure 11:
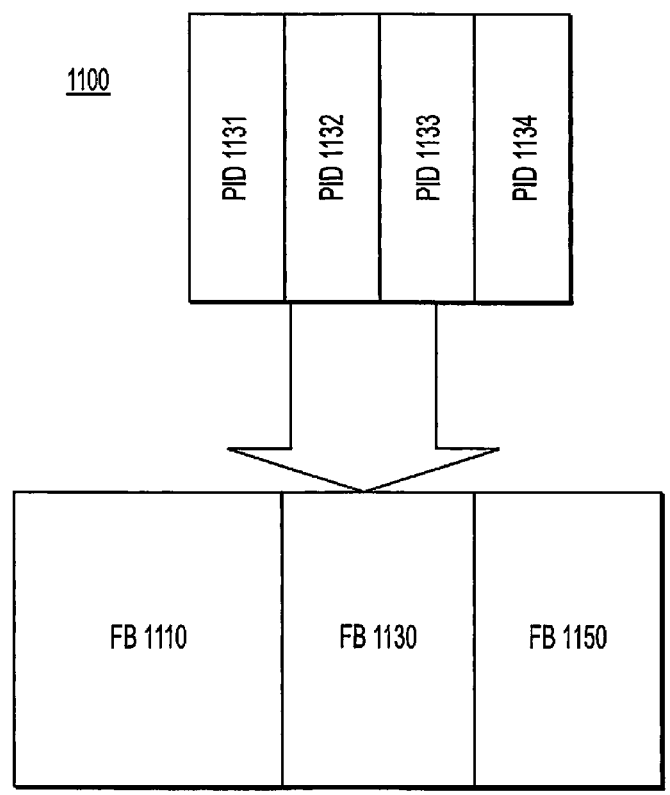
FIG. 11 is a frequency spectrum diagram that shows how content may be mapped over a cable system.

Referring to FIG. 11, frequency spectrum diagram 1100 shows the frequency/bandwidth allocation structure that may be used in a cable system (e.g., network 945). A typical cable system may use multiple frequencies and PIDs within each frequency. However, for exemplary purposes, three frequency base bands are shown, Frequency Band (FB) 1110, FB 1130, and FB 1150. Typically, each frequency band represents a base band around which multiple channels/Ms within the frequency are used. For example, several frequencies may be modulated around a higher base band frequency. In another example, several channels may be time-division multiplexed around the base band frequency. In yet another example, each channel may be Quadrature Amplitude Multiplexed around a base band signal. Additionally, there is typically a guard band (not shown) that separates adjacent signals.

FB 1130 illustrates how 4 PIDs (e.g., channels) may be multiplexed into the one frequency band. RB 1130 includes PIDs 1131, 1132, 1133, and 1134. Each of these PIDs may be a channel accessible by several terminals or a personalized channel. The channels may be dynamically accessible and/or programmable. For example, implementing a personalized channel may involve allocating a frequency/PID pair for each terminal. The media switch 930 then coordinates content requests with the cable headend to ensure that the required content is transmitted to the cable headend for mapping onto the specified frequency/PID. In another example, a terminal 950 may receive a message indicating which frequency/PID pair will be used to transmit the requested content. These frequency/PID pairs may be reused and shared, depending on the state and configuration of the network 945.

Figure 12:
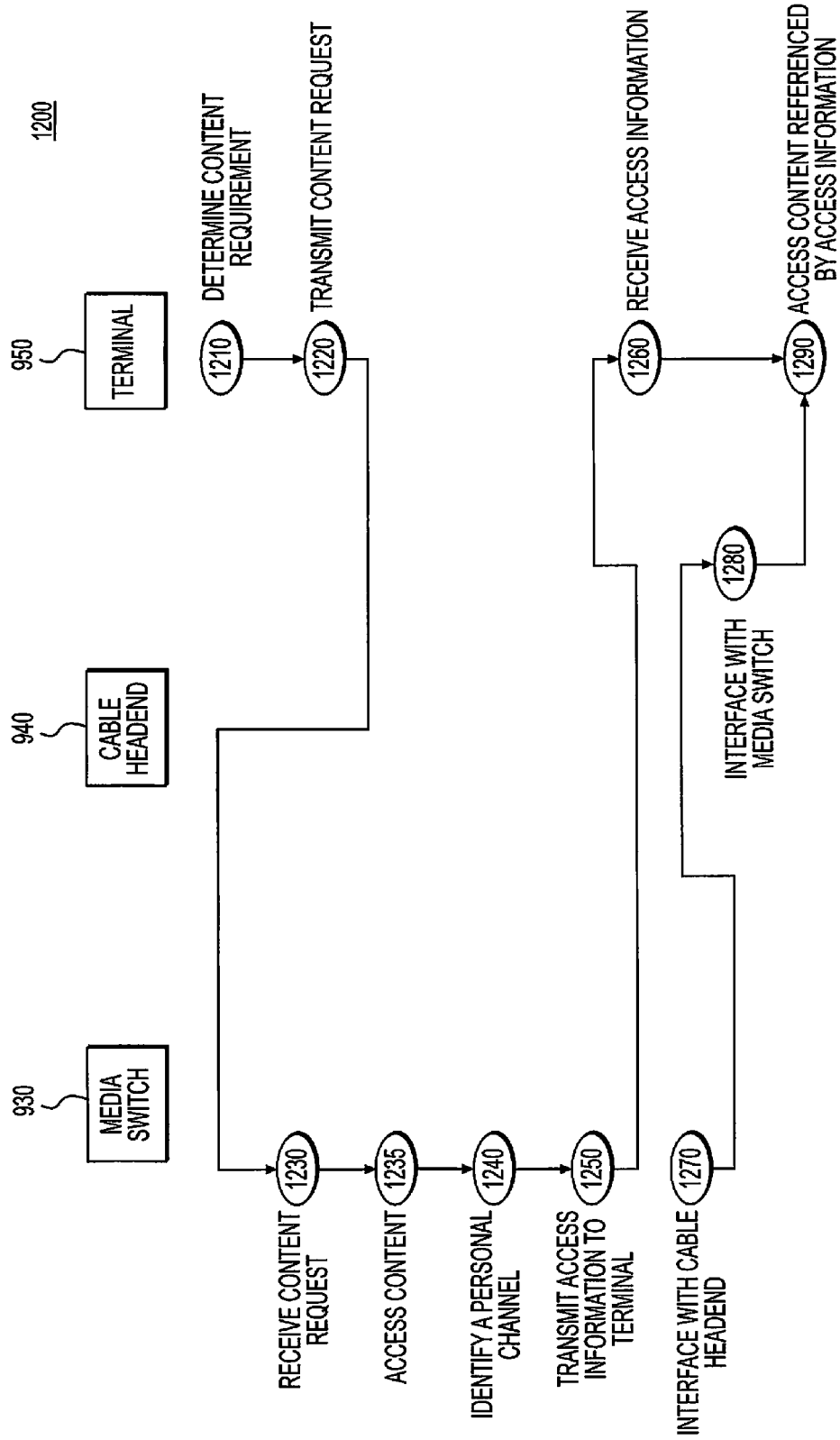
FIG. 12 is a flow chart showing how a cable system may enable a terminal to access personalized content from a media switch through a cable system.

Referring to FIG. 12, a flow chart 1200 shows how a media switch 930 may interface with a terminal 950 to enable the terminal 950 to request content. Initially, the terminal 950 determines a content requirement (step 1210). Determining a content requirement may include perceiving a user selection of content, explicitly, implicitly or intentionally. For instance, in a cable television environment, determining a content requirement may include having a consumer interface with an automated programming guide showing programming content and available times for the programming content. In another example, determining a content requirement may include selecting a piece of on-demand content from a list of on demand offerings. In yet another example, determining a content requirement may include changing a channel to which the user is tuned. The appearance of changing channels may involve interfacing through an intermediary interface so that the user cycles through preferred channels in order of preference. The preferred channels list may be generated in a seamless manner without requiring user intervention.

With the content requirement, the terminal 950 transmits a content request (step 1220). Transmitting a content request may be performed through in-band or out-of-band communications. The media switch 930 receives the content request (step 1230).

The media switch 930 accesses content (step 1235). Accessing content may include requesting content from an on-demand device, a broadcasting switch, and/or an on-demand switch. Accessing content may include loading the content to the broadcasting switch and/or the on-demand-switch. If the first piece of content has been loaded to either of these switches, accessing content may include adding terminal address information to a list of addresses on the duplicating switch. For example, if the terminal requests live content being duplicated on a broadcasting switch, an IP address related to the terminal may be added to the list of devices to which the broadcasting switch is sending content. For example, the broadcasting switch may receive a virtual IP address for a cable headend interface that maps the streamed content to a personal channel over the cable system.

Accessing content also may include receiving content automatically (e.g., from a satellite or an analog feed), or in response to a scheduled pushing program designed to ensure timely delivery of the content.

The media switch 930 identifies a personal channel (step 1240). Identifying a personal channel generally includes identifying a resource (e.g., a modulated channel) within the cable system available to distribute the content to the terminal. The personal channel may be dedicated to a single terminal. For example, identifying the personal channel may include accessing a database of modulated channels (e.g., a frequency/PID pair) not being used and allocating one of the available channels for exclusive use by the requesting terminal. In another example, the personal channel may be identified in advance and identifying the personal channel may include determining that the personal channel exists and is being used by the requesting terminal.

Identifying a personal channel (step 1240) may include identifying access information that enables the terminal 950 to access the personal channel. The access information may include parameters describing the frequency and the process identification number within the frequency. In another example, the access information may include a label that serves as a proxy for this information. For example, the terminal 950 may include a mapping function that converts a label into the frequency and the process identification number.

In any event, the media switch 930 transmits the access information to the terminal 930 (step 1250), which receives the access information (step 1260).

The media switch 930 interfaces with a cable headend 940 (step 1270). Typically, interfacing a cable headend 940 includes enabling content sent by the media switch 930 to be distributed by the cable headend 940 on the personal channel. The cable headend 940 interfaces with the media switch 930 (step 1280). One example of interfacing may include determining a mapping of content into a personal channel as a frequency/PID pair. In another example, interfacing may include accessing a configuration database describing the frequency/content mapping. In yet another example, interfacing between the media switch 930 and the cable headend 940 may include managing reception of an IP stream or other transport stream with the requested content from the media switch 930 to the cable headend 940. Although an exemplary IP stream has been described, the cable system is not limited to using IP to distribute requested content.

Interfacing with the cable headend 940 may be performed in conjunction with other operations that have been described. For example, the cable headend 940 may determine what frequency/PID pairs are available, map the requested content to a selected pair in the available pairs, and transmit those parameters to the media switch 930 for transmission to the terminal 950. in another example, the media switch 930 also manages the frequency/PID mappings and directs the cable headend 940 to map the content to the designated. frequency/PID.

In any event, the terminal receives the content by referencing the location indicated in the access information (step 1290). In the example where the personal channel is already created and being used, accessing content information may include receiving the newly requested content on the personal channel already being used.

Although the operations described are described in a sequential order, the operations described above may be performed in parallel and/or a different order. For example, the content may be accessed before the content request is received. Similarly, the media switch 930 may interface with the cable headend 940 before or in conjunction with accessing content. Other sequences and combinations may be used.

Figure 13:
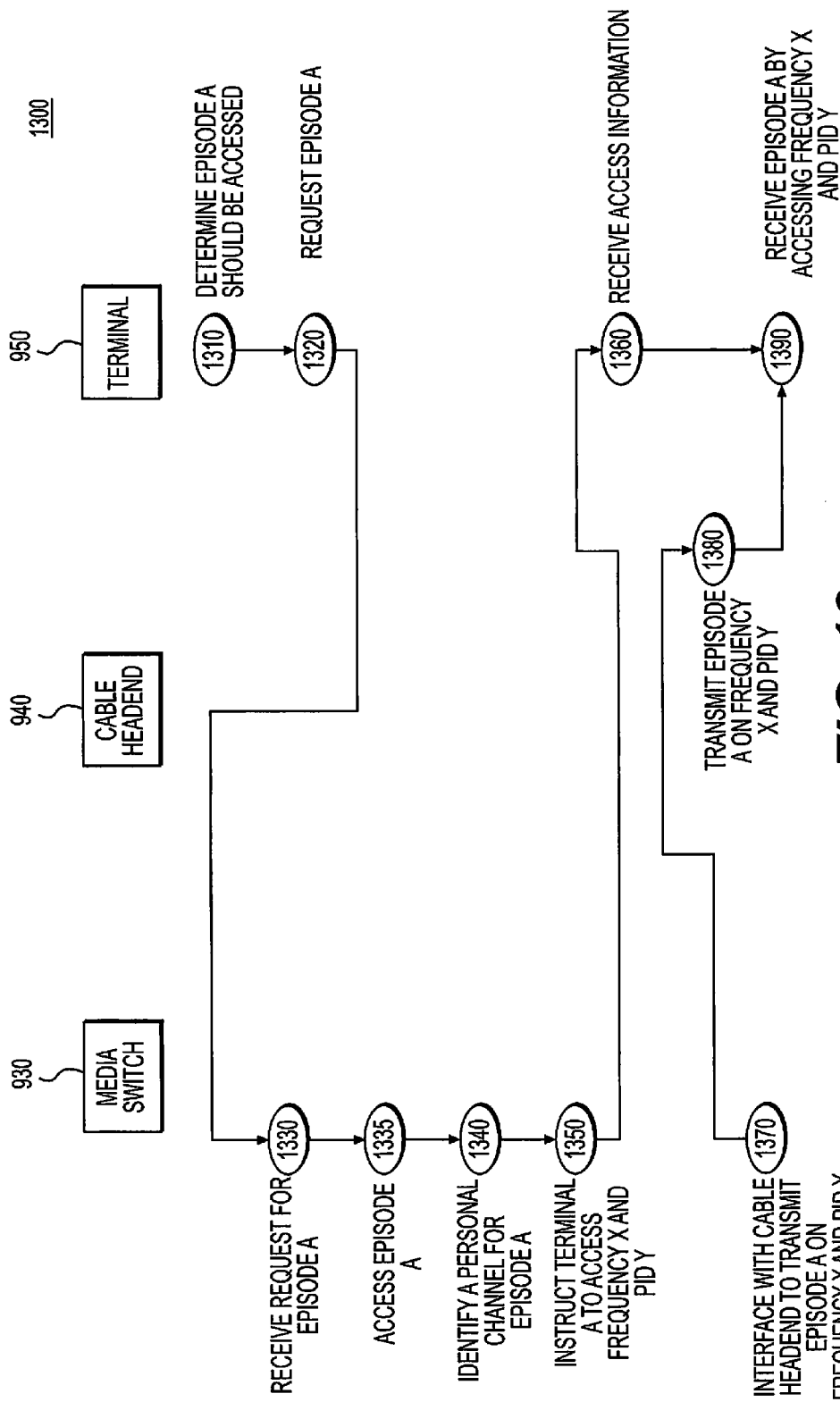
FIG. 13 is a flow chart showing how a terminal may access a particular episode by interfacing with a media switch through a cable headend.

FIG. 13 is an exemplary flow chart 1300 showing a terminal accessing personalized content through a media switch. Generally, the systems shown in FIG. 13 relate to the systems described previously. For example, the media switch 930, the cable headend 940 and the terminal 950 may relate to the media switch 930, the cable headend 940, and the terminal 950 described with respect to FIGS. 9-12. However, flow chart 1300 illustrates how a terminal accesses a particular television episode.

Initially, the terminal 950 determines episode A of television show B should be accessed (step 1310). For example, the user may have missed the scheduled transmission of episode A and elect to watch the missed episode. Alternatively, the user may enjoy the particular series, or be participating in a distance-learning course.

The terminal 950 transmits a request for episode A to the media switch 930 (step 1320). The media switch 930 receives the request, either through the cable system (e.g., cable headend 940), or through alternate channels (not shown) (step 1330). The media switch accesses episode A (step 1335). In one instance, accessing episode A involves accessing a data store local to the media switch 930 that is used to store recently broadcast content. Alternatively, the user associated with terminal 950 may be allocated a personal data store on the media switch 930. The user may actively manage this personalized data store on the media switch 930, or the media switch administrator may proactively manage content on the user's behalf. For example, the media switch may determine that the user routinely requests television show B and ensure that several episodes from television show B are stored and available for the user to access.

The media switch 930 identifies a personal channel so that the terminal 950 may access episode A (step 1340). For example, the media switch determines that frequency X and PID Y may be used to transmit episode A. Identifying the personal channel may include scheduling the transmission so that the transmission does not conflict with other scheduled transmissions. For example, if the media switch 930 determines that, due to terminal 950 "pausing" the stream, episode A would overlap a subsequent transmission on frequency X and PID Y, the overlapping conflict may be resolved. In one case, the time-shifting ability of the current transmission may be limited. For example, the user may be precluded from pausing episode A. The media switch 930 also may reschedule the subsequent transmission to a different frequency and channel. Other options may include, but are not limited to, canceling either the present or the subsequent transmission.

The media switch 930 instructs the terminal to access frequency X and PID Y to access the personal channel (step 1350). The terminal 950 receives the access information (step 1360). The media switch 930 interfaces with the media switch 930 to transmit episode A on frequency X and PID Y (step 1370). The cable headend then may transmit episode A on frequency X and PhD V (step 1380), the terminal 950 then receiving episode A by accessing frequency X and PID Y (step 1390).

Although flow chart 1300 is shown as a sequence of events, one or more of the operations may be performed concurrently or in an alternate order. For example, the terminal 950 may access frequency X and PID Y (step 1390) before or concurrent with the media switch 930 interfacing with the cable headend 940 (steps 1370 and 1380).

Although the media switch 930 and the cable headend 940 are described in the context of network operations, the media switch 930, the cable headend 940, and/or the terminal 950 may use one or more proxy signals or messages instead of network packets to negotiate the transmission of the personal channel. For example, the cable headend 940 may act as a bridge between IP commands and cable system commands used to communicate with the terminal 950.

Other implementations are within the scope of the following claims, For example, the media switch 930 may relate the content request to available resources. Typically, relating the content request to available resources includes determining whether the piece of content requested is already being hosted on existing resources. For example, a user may request the same movie that another user has requested. The transmission of the movie may be coordinated so that the users may share the same resource (e.g., frequency/PID pair). In support of this, a longer series of trailers may be transmitted so that multiple users may access the same resource without missing the featured content.

Another example of relating the content to available resources may include determining the state of demand for resources so that allocation of the frequency/PID pairs accommodates the largest number of users and/or the priorities of the cable provider. For example, a cable provider may determine that utilization is approaching the system capacity. As a result, some resources, such as Internet access channels, may be reallocated to accommodate premium access channels.

The media switch 930 may determine if the existing resources (e.g., existing content being transmitted) may be used to enable access to the content requested. If so, the media switch 930 transmits access information for the existing resource to the terminal (e.g., frequency/PID pair already providing the content). If not, the media switch 930 transmits the content to the cable headend 940. The cable headend 950 receives the content and maps the content into the prescribed access information.

The media switch 930 may include a controller structured and arranged to accommodate changing cable system architectures. For example, the media switch 930 may include a broadcasting switch and a scheduling controller, while other on-demand servers provide on-demand content. The scheduling controller may interface with these on-demand servers to direct content to the cable headend 940. In one instance, the scheduling controller may interface with off-device on-demand content to map it to the access information.

Although operations have, been described in the context of a pause function, similar functionality such as fast forward, rewind, and stop operations may be implemented. Other operations may include, but are not limited to, track selection so that a particular program may be advanced program-by-program by selecting an icon or figure to advance to the next piece of content, e.g., the next show on television. Although it has been described in the context of a cable system, implementations of a cable system may include fiber (optical), and/or wireless links. For example, a wireless local loop may be used to distribute video content to one or more users. Alternatively, fiber may be distributed to a user's home for distribution.

Although the media switch and the headend have been described in the context of different systems, the media switch and the headend may be combined in one or more systems. This system may include broadcast and on-demand functionality. Indeed, depending on the timing constraints in the system configuration, the broadcast switch and the on-demand switch may be the same system. For example, a broadcast switch may include a switch with a very short buffer designed to keep content that is being transmitted within a narrow window of time. In contrast, an on-demand switch may be configured to store content configured to correspond to a large period of time.

What is claimed is:

1. A method of enabling a terminal to access content requested by the terminal, the method comprising the following operations performed by one or more processors:
   receiving, from a terminal, a request for distribution of a piece of content from a media switch;
   reserving a personal cable channel over which to distribute the piece of content, for exclusive use by the terminal for a period of time corresponding to the length of the piece of content;
   transmitting, from the media switch to the terminal, reusable access information associated with the personal cable channel to enable the terminal to access the piece of content from a cable headend;
   transmitting, from the media switch to the cable headend, the piece of content for transmission to the terminal as a video or audio feed on the identified personal cable channel;
   detecting a pause command from the terminal;
   determining that the pause command will cause a conflict with a subsequent transmission on the personal cable channel; and
   rescheduling the subsequent transmission to a second cable channel that differs from the personal cable channel.

2. The method of claim 1, wherein the reusable access information identifies a baseband frequency and a channel pairing.

3. The method of claim 2, wherein the transmitting is performed by multiplexing the channel on the baseband frequency.

4. The method of claim 2, wherein the request for distribution is formed by detecting at least one of: a user selection of a program from an automated programming guide, a user selection of a piece of on-demand content, and a user selecting a new channel.

5. The method of claim 2, wherein
   the request for distribution is formed by automatically determining a next preferred channel of a list of preferred channels in order of preference without user intervention, and
   the piece of content corresponds to a program of the next preferred channel.

6. The method of claim 2, further comprising:
   accessing, subsequent to receiving the request for distribution, the piece of content from an on-demand switch.

7. An apparatus, comprising:
   a storage device; and
   a processor coupled to the storage device, wherein the storage device stores a program for controlling the processor, and the processor, operative with the program, is configured to:
   receive, from a terminal, a request for distribution of a piece of content from a media switch;
   reserve a personal cable channel over which to distribute the piece of content, for exclusive use by the terminal for a period of time corresponding to the length of the piece of content;
   transmit, from the media switch to the terminal, reusable access information associated with the personal cable channel to enable the terminal to access the piece of content from a cable headend;
   transmit, from the media switch to the cable headend, the piece of content for transmission to the terminal as a video or audio feed on the identified personal cable channel;
   detect a pause command from the terminal;
   determine that the pause command will cause a conflict with a subsequent transmission on the personal cable channel; and
   reschedule the subsequent transmission to a second cable channel that differs from the personal cable channel.

8. The apparatus of claim 7, wherein the reusable access information identifies a baseband frequency and a channel pairing.

9. The apparatus of claim 7, wherein the transmitting is performed by multiplexing the channel on the baseband frequency.

10. The apparatus of claim 7, wherein the request for distribution is formed by detecting at least one of: a user selection of a program from an automated programming guide, a user selection of a piece of on-demand content, and a user selecting a new channel.

11. The apparatus of claim 7, wherein
the request for distribution is formed by automatically determining a next preferred channel of a list of preferred channels in order of preference without user intervention, and
the piece of content corresponds to a program of the next preferred channel.

12. The apparatus of claim 7, wherein the processor is further configured to:
access, subsequent to receiving the request for distribution, the piece of content from an on-demand switch.

13. A non-transitory computer-readable medium storing instructions that, when executed by at least one processor, perform operations comprising:
receiving, from a terminal, a request for distribution of a piece of content from a media switch;
reserving a personal cable channel over which to distribute the piece of content, for exclusive use by the terminal for a period of time corresponding to the length of the piece of content;
transmitting, from the media switch to the terminal, reusable access information associated with the personal cable channel to enable the terminal to access the piece of content from a cable headend;
transmitting, from the media switch to the cable headend, the piece of content for transmission to the terminal as a video or audio feed on the identified personal cable channel;
detecting a pause command from the terminal;
determining that the pause command will cause a conflict with a subsequent transmission on the personal cable channel; and
rescheduling the subsequent transmission to a second cable channel that differs from the personal cable channel.

14. The medium of claim 13, wherein the reusable access information identifies a baseband frequency and a channel pairing.

15. The medium of claim 13, wherein the request for distribution is formed by detecting at least one of: a user selection of a program from an automated programming guide, a user selection of a piece of on-demand content, and a user selecting a new channel.

16. The medium of claim 13, wherein
the request for distribution is formed by automatically determining a next preferred channel of a list of preferred channels in order of preference without user intervention, and
the piece of content corresponds to a program of the next preferred channel.

17. The medium of claim 13, the operations further comprising:
accessing, subsequent to receiving the request for distribution, the piece of content from an on-demand switch.

* * * * *